(12) United States Patent
Piasecki et al.

(10) Patent No.: US 7,821,148 B2
(45) Date of Patent: Oct. 26, 2010

(54) WIND TURBINE

(76) Inventors: Frederick W. Piasecki, Second St. Terminus, Essington, PA (US) 19029; Douglas Johnson, Second St. West, Essington, PA (US) 19029

( * ) Notice: Subject to any disclaimer, the term of this patent is extended or adjusted under 35 U.S.C. 154(b) by 0 days.

(21) Appl. No.: 12/541,353

(22) Filed: Aug. 14, 2009

(65) Prior Publication Data
US 2010/0133848 A1   Jun. 3, 2010

(51) Int. Cl.
*F03D 9/00* (2006.01)
*H02P 9/04* (2006.01)

(52) U.S. Cl. .......................................... 290/44; 290/55
(58) Field of Classification Search .................. 290/44, 290/55; 415/4.2, 4.3, 4.5, 2.1, 907; 416/1, 416/10, 12, 14, 132 B
See application file for complete search history.

(56) References Cited

U.S. PATENT DOCUMENTS

| | | | | |
|---|---|---|---|---|
| 2,273,084 A * | 2/1942 | Ansley | .......................... | 290/44 |
| 2,360,791 A * | 10/1944 | Putnam | .......................... | 416/37 |
| 4,029,434 A * | 6/1977 | Kenney | | |
| 4,352,629 A * | 10/1982 | Cheney | | |
| 4,423,333 A * | 12/1983 | Rossman | | |
| 4,435,646 A * | 3/1984 | Coleman | | |
| 4,533,297 A * | 8/1985 | Bassett | .................... | 416/132 B |
| 4,545,728 A * | 10/1985 | Cheney | | |
| 4,632,637 A * | 12/1986 | Traudt | | |
| 4,767,939 A * | 8/1988 | Calley | .......................... | 290/55 |
| 5,295,793 A * | 3/1994 | Belden | ......................... | 416/13 |
| 5,570,997 A * | 11/1996 | Pratt | | |
| 6,379,115 B1 * | 4/2002 | Hirai | | |
| 6,441,507 B1 * | 8/2002 | Deering | | |
| 6,923,622 B1 * | 8/2005 | Dehlsen | | |
| 7,013,203 B2 * | 3/2006 | Moore | | |
| 7,192,252 B2 * | 3/2007 | Duguet et al. | ................ | 416/143 |
| 7,245,039 B2 * | 7/2007 | DuHamel | ..................... | 290/44 |
| 7,351,033 B2 * | 4/2008 | McNerney | | |
| 7,425,775 B2 * | 9/2008 | Shibata et al. | ................. | 290/55 |
| 7,436,083 B2 * | 10/2008 | Shibata et al. | ................. | 290/44 |
| 2002/0067274 A1 * | 6/2002 | Haller | ......................... | 340/601 |
| 2004/0042894 A1 * | 3/2004 | Smith | .......................... | 416/4.3 |
| 2004/0076518 A1 * | 4/2004 | Drake | .......................... | 416/10 |
| 2007/0243063 A1 * | 10/2007 | Schellstede | | |
| 2010/0068058 A1 * | 3/2010 | Sorensen | ...................... | 416/41 |

* cited by examiner

*Primary Examiner*—Julio Gonzalez Ramirez
(74) *Attorney, Agent, or Firm*—Lipton, Weinberger & Husick; Robert J. Yarbrough

(57) ABSTRACT

A wind turbine has a horizontal axis of rotation and features a hub beam and two turbine blades attached to opposing ends of the hub beam in a spaced-apart relation. The blades have a first position in which the blades are radially arrayed about the hub beam. The blades have a second position in which the blades are folded and moored to the tower. A control system communicates with weather sensors and determines whether to move the blades between the first and second positions.

20 Claims, 17 Drawing Sheets

# WIND TURBINE

BACKGROUND OF THE INVENTION

1. Field of the Invention

The Invention relates to wind turbines for production of electrical power. The invention is particularly applicable to wind generators that may be used in locations where high average winds are not expected but that nonetheless must survive adverse weather conditions and loadings specified by applicable building codes for wind turbines.

2. Description of the Related Art

The potential for wind power energy generation for a location is measured by a scale referred to as the 'wind power class.' There are seven 'wind power classes,' ranging from class 1, with annual average wind speeds of less than 5.6 meters/sec at an elevation of 100 meters, to class 7, with annual average wind speeds of 8.8 meters/sec and above at an elevation of 100 meters. Much of the United States (and the world) has relatively low average wind speeds. For example, much of the Commonwealth of Pennsylvania falls within classes 3 or 4, with annual average wind speeds between 6.4 to 7.5 meters/sec at an elevation of 100 meters.

The wind power industry has focused development of wind power in areas of relatively high average wind speed. The prior art wind generators currently available were developed for such areas. Such generators generate only a fraction of their nameplate rating when used in areas of lower average wind speed.

Current-technology wind generators generally are horizontal up-wind wind turbines, with the axis of rotation of the blade horizontal to the ground and the rotating blade upwind of the supporting tower. The forces acting on the blade must be reacted (that is, opposed and supported) by the blade, blade root, hub including bearings, drive system and tower. Those forces include the steady force resulting from the weight of the blade and the varying force of the wind. The force of the wind acting on the blade varies along the span of the blade and varies with each revolution of the blade. Gusts, variable wind speeds and inclement weather can place a very high loading on the structures of a wind turbine. Wind turbines also are subject to frequent starting and stopping and loads.

The traditional approach to the problem of designing a wind turbine that will survive inclement weather is to select a design that is very rigid and strong. In current technology wind turbines, the blade, hub and tower are rigid. The problem with this approach is that the resulting turbines are inefficient at low wind speeds, bulky, heavy, expensive, difficult to build and difficult to transport. The blades, blade roots, bearings, hubs and power transmission system are areas of particular concern.

For large current-technology wind turbines, the gear sets and bearings are very large, with some gears being several feet in diameter. Such large gears can be produced by very few suppliers using very expensive, custom-built equipment. Large current-technology wind turbines cannot be easily transported by road due to the size and bulk of the components, particularly the tower and blades. Erection of such a turbine is a significant construction project requiring use of heavy equipment and large cranes.

A horizontal up-wind wind turbine must include a yaw bearing connecting the nacelle to the tower to support the nacelle and turbine blades and to turn the axis of rotation, and hence the blades, into the wind. Current technology wind turbines utilize a single large-format yaw bearing located at the top of the tower. Because the turbine blades are very heavy and are supported by the nacelle at a distance from the yaw bearing, the local forces acting on the single yaw bearing are multiplied by the lever arm created by the nacelle. Current technology yaw bearing must be very large, strong, and expensive to support the resulting bending moments.

Because the turbine blade rotates, the relative speed and hence relative direction between the turbine blade and the wind varies along the length of the blade from the root to the tip. The blade therefore must have a twist to achieve the optimum angle of attack of the rotating blade. Because of the size of the blades, the blades must be larger at the root end to provide adequate strength to support the resulting weight.

The low-wind speed turbine designer is faced with conflicting design goals—design a turbine that efficiently extracts power from the wind in low wind conditions but that can also survive the loads, both steady and cyclic, imposed by inclement weather.

The prior art does not teach the wind turbine of the Invention.

SUMMARY OF THE INVENTION

The present Invention is a wind turbine electrical generator for use in low wind conditions, including areas of average wind speed of 6.4 meters/second at an elevation of 100 meters. The present Invention can be applied to the harvesting of wind power at any wind speed.

The wind turbine of the Invention is of the horizontal upwind type, with a rotor rotating about a horizontal axis of rotation on the upwind side of a tower or of the horizontal downwind type, with the blades rotating about a horizontal axis of rotation on the downwind side of the tower. The tower supports a nacelle above the ground. The nacelle is connected to the tower through yaw bearings and a yaw drive system to allow the axis of rotation of the blades to be oriented into the wind. The nacelle houses an electrical generator that is connected to the hub of the rotor through a power transmission system. The power transmission system includes a speed increaser gear train to translate the 11 rpm design rotation speed of the rotor to the rotation requirements of the electrical generator (with a design speed of 1800 rpm).

Folding Turbine Blade

Purpose

The rotor features turbine blades that fold and that may be moored to the tower during events of excess wind speed or other adverse weather conditions. Mooring the blade to the tower unloads the blade, blade root, hub and blade bearings, substantially reducing the force of the wind on those components. As a result, relatively lightweight and inexpensive hub, bearings, power transmission systems and blades may be used for a large wind turbine, substantially reducing the cost of the wind turbine and easing maintenance tasks.

Structure of the Folding Blade

The rotor is composed of three sections of approximately equal length; namely, a hub beam and two turbine blades. The center of the hub beam is attached to the hub by a teetering hinge. A feathering hinge is attached to each end of the hub beam and a lag/fold hinge is integral to each feathering hinge. The turbine blades are attached to the opposing ends of the hub beam at the lag/fold hinges and extend radially about the teetering hinge so that the hub beam supports the blades in a spaced-apart relation about the teetering hinge. The turbine blades define a swept annular area as the rotor rotates about a low-speed shaft coincident with the teetering hinge. The wind passing through the annular area and encountering the turbine blades largely determines the power that can be harvested by the wind generator.

The feathering hinge allows the blade to rotate about a feathering axis of rotation corresponding to the longitudinal dimension of the blade, allowing the angle of attack of the blade to be changed. The blade is rotated about the feathering hinge by a pair of hydraulic screw jacks or hydraulic pistons. The lag/fold hinge allows the blade to pivot with respect to the feathering hinge in a plane corresponding generally to the chord of the blade at the blade root. The chord is a straight line from the leading edge to the trailing edge of the blade. A hydraulic screw jack mounted between the blade and the feathering hinge rotates the blade about the lag/fold hinge. The feathering hinge in combination with the lag/fold hinge allows controlled movement of the turbine blades in three dimensions.

A fabric strap, preferably composed of a para-aramid synthetic fiber, such as Kevlar® or Twaron®, is formed into a loop. The loop extends the length of the hub beam and is attached to both of the feathering hinges at either end of the hub beam. The fabric strap retains the feathering hinges, and hence the turbine blades, to the opposing ends of the hub beam. As the turbine rotates about the teetering hub, a portion of the weight of the blade that is below the horizontal with respect to the hub is transferred by the strap to the feathering hinge that is above the horizontal. The proportion of the weight transferred depends upon the rotational location of the rotor. When the rotor is in the vertical position, all of the weight of the lower turbine blade is supported by the upper feathering hinge. Because of the strap, the hub beam experiences the load presented by the weight of the blade as a compression load rather than a tension load. The connection between the hub beam and the feathering hinge therefore is not required to support the weight of the blade in tension.

The centrifugal forces of the rotating blades are transferred from each blade to the other through the strap and are not seen by the hub beam. The use of the strap eliminates the need for a tension-type bearing connection between the hub beam and each feathering hinge that is capable of supporting the centrifugal force generated by the rotating blades.

In the absence of the strap, the connection between the feathering hinge and the hub beam would be very heavy and robust to support the tension loads caused by the weight of the blades and caused by the centrifugal forces generated by the rotating blades. The strap relieves the hub beam of all such tension loads and allows the hub beam, feathering hinge and the connection between the hub beam and feathering hinge to be much lighter and less expensive than would otherwise be possible.

First and Second Positions

The turbine blades have a first, or deployed, position and a second, or moored, position. When in the deployed position, the blades are radially arrayed about the hub and configured for rotation in response to a wind passing through the annular area defined by the rotor. When in the moored position, the blades are folded about the pitch and lag/fold hinges and the free ends of the folded blades are connected to the tower. The lateral separation of the turbine blades from the hub by the hub beam permits no mechanical interference with the nacelle, tower or hub when the turbine blades are folded to the tower by the action of the feathering hinge and the lag/fold hinge in cooperation.

Actuators

Actuators move the turbine blades between the first, or deployed position, and the second, or moored position. The actuators include an electrical engagement system, actuators to operate the feather hinge, actuators to operate the lag/fold hinge, the yaw motor, and mooring clamps to clamp the blades to the tower. When the control system issues a command to moor the turbine blades, the electrical engagement system disconnects the electrical generator from the electrical load powered by the generator. Feather hinge actuators feather the blades to stop the rotation of the rotor. The feather hinge actuators may be hydraulically or electrically operated. A brake/indexer holds the stopped rotor in position for mooring. The yaw motor rotates the nacelle about the yaw bearing to the position appropriate for mooring. A yaw sensor and a blade position sensor confirm that the hub beam is properly oriented for mooring. The feather hinge actuators orient the pitch of the blades about the feathering hinge (and hence the orientation of the lag/fold hinge) for mooring. The lag/fold hinge hydraulic screw jack then folds the blade to a position from which the blade can be mechanically secured to the tower. A cradle is attached to the tower and receives the turbine blade. A mooring clamp actuator mechanically clamps the blade to the cradle.

Unmooring of the blades is a reversal of the mooring process. The mooring clamp releases the blades from the cradle. The lag/fold hinge hydraulic screw jack unfolds the blades to the first, or deployed, position in which the blade extends radially about the hub. The feathering hinge actuators adjust the pitch of the blades and the yaw motor moves the axis of rotation of the blades into the wind. The brake/indexer is released, allowing the blades, transmission and generator to rotate. The electrical engagement system places the generator back on line, generating electrical power.

Teetering Hinge

The hub of the rotor includes a teetering hinge that allows teetering motion of the blades normal to the plane of rotation of the rotor. As one blade moves in the downwind direction, the other blade moves in the upwind direction. The teetering, or flapping, motion is damped by dampers that may be elastomeric or hydraulic and by the mass of the rotating blades. The teetering hub allows the blades to absorb a portion of the cyclical and varying forces on the blades, reducing the stress on the blades and reducing the required strength and weight of the blades, blade root and blade hub.

Hub Beam

The hub beam serves several purposes. First, the length of the hub beam and the two blades are selected to be approximately 127 feet, so that the hub beam and the blades can be transported readily over the road by truck, while providing a wind turbine with a total blade diameter of approximately 400 feet.

Second, mounting the blade at either end of the hub beam places the feathering hinge and lag/fold hinge at a distance from the nacelle defined by generally one-half of the length of the hub beam. The spaced-apart relation of the hub and the feathering and lag/fold hinges provides the mechanical clearance so that the blades may be folded to the tower without interfering with the nacelle.

Third, the power capable of being generated by the wind turbine is determined by the annular area swept by a revolution of the blade. Increasing the outside diameter of the annulus swept by the blade increases the swept annular area by more than decreasing the inside diameter swept by the blade. Structural and aerodynamic considerations require that the inner portion of the blade have a larger chord and thickness than the outer portion of the blade. The inner portion of any turbine blade is relatively heavy and expensive to manufacture compared to the outer portion of the blade, while providing comparatively little benefit in terms of power production.

Fourth, the use of a hub beam moves the portion of the turbine blade that may 'cone' in response to the force of the wind further out on the radius of the turbine. 'Coning' is the tendency of a wind turbine blade to deform in response to the wind and to take on a cone-like shape. Excessive coning can cause a turbine blade of a horizontal upwind type to physically strike the tower, damaging both the blade and the tower. Use of the hub beam moves the deforming portion of the rotor away from the hub and reduces the required stiffness of the blade while reducing the likelihood of tower strikes by the rotating blade.

Control System

The purpose of the control system is to instruct the actuators whether to maintain the turbine blades in the first (deployed) or second (moored) position and whether to move the turbine blades between the first and second positions. The purpose of the control system also is to determine optimal settings and sequence for each actuator for efficient operation of the wind turbine.

The control system includes at least one weather sensor. The weather sensor is configured to detect a weather condition. The detected weather condition may include wind speed, barometric pressure, temperature or humidity. The weather sensor may be a Doppler radar or a wind profiler to detect air movement or differences in air movement, or may be any other weather sensor that provides useful information to the control system. The weather sensors available to the control system may include a weather satellite, either alone or in combination with other sensors. The weather sensor may be one of a plurality of weather sensors and the detected weather condition may be one of a plurality of weather conditions. The weather sensor may be operated by a commercial or government weather forecasting or reporting service. The weather sensors may be located remotely from the wind turbine.

The control system includes a microprocessor and computer memory accessible by the microprocessor. The microprocessor is configured to be in communication with the weather sensor and with the actuators. The computer memory stores a control rule. The microprocessor continually compares the weather conditions detected by the weather sensors to the control rule and determines whether the turbine blades should be moved between the first and second positions. The control rule is selected to detect or predict wind speeds and turbulence at the wind turbine that may exceed the normal operating loads for the wind turbine. The control rule will utilize the detected or predicted wind speeds and turbulence to prevent conditions in which the turbine blades may be exposed to forces that could exceed the design or other operating limits of the turbine blade, blade root, hub, bearings power transmission system, tower, or any other component of the wind power generator.

For example, the weather sensor may be an anemometer and the weather condition detected may be wind speed. The control rule is designed such that if a measured wind speed is detected by one or more anemometers in an anemometer array that is a predetermined percentage of the maximum design wind speed of the wind power generator, then the control system will command the actuators to move the turbine blade from the first, or deployed, position to the second, or moored, position.

As a second example, weather sensors may be a thermometer measuring temperature and a hygrometer measuring humidity. The control rule may be selected to determine whether the measured temperature and humidity indicate that an unacceptable danger of icing exists. The microprocessor compares the measured temperature and humidity to the control rule to determine if the probability of icing is unacceptable. If the microprocessor determines that an unacceptable likelihood of icing does exist, the microprocessor will cause the control system to direct the mooring actuators to move the turbine blades from the first to the second position.

As a third example, the weather sensor may be a radar, Ladar (laser radar), or sonar wind profiler or Doppler radar configured to detect air movement. The microprocessor compares the data collected to the control rule and determines whether wind conditions or gradients are dangerous to the wind turbine. If the microprocessor so determines, the control system will direct the mooring actuators to move the turbine blade from the first to the second position.

As a fourth example, the weather sensor may be a satellite recording optical or other images. The weather sensors may be operated by any person, including a commercial or government weather service. The microprocessor may receive a weather prediction or caution from the commercial or government weather service based on data from the satellite weather sensor and other weather sensors. If the microprocessor determines that the predicted weather condition may exceed an operational limitation of the wind turbine, the microprocessor may command the control system and actuators to move the turbine blades from the first to the second position.

Time is required for the actuators to complete the task of taking the electrical generator off line, slowing the rotating turbine blades to a stop, correctly orienting the turbine blades with respect to the tower, folding the turbine blades and mooring the turbine blades to the cradles attached to the tower. If the weather sensor is located on the tower or too close to the tower, the weather sensor may identify a weather condition dangerous to the wind generator only after the dangerous condition occurs. The weather sensor or sensors preferably are located at a sufficient distance from the tower to allow the control system to react to a detected weather condition prior to the time that the weather condition reaches the wind generator. Preferably, weather sensors are located at a plurality of locations remote from the tower and in a sufficient density to detect potentially dangerous local conditions such as thunderstorms, wind gusts, or micro-gusts.

Wind turbines commonly are arrayed in wind farms comprising a plurality of wind turbines. A single control system may be utilized to control all of the wind turbines in a wind farm or in multiple wind farms. Conversely, each wind turbine may be equipped with a dedicated control system. A network of weather sensors may be deployed in the vicinity of a wind farm and the weather conditions detected by the network of weather sensors may be utilized by the microprocessor to control all or some of the turbines in a wind farm. The network of weather sensors may include weather sensors located remote from the wind turbine, such as weather sensors operated by commercial or government weather forecasters. The single control system may be under the control of a live human operator. The live human operator may override an automated command of the control system if the human operator determines that a control command different from that made by the control system is advisable.

The control system also may control all aspects of the operation of the wind turbine. For example, the horizontal axis of rotation of the turbine blades must be oriented into the wind for efficient power production. The control system will monitor wind direction through the weather sensors and will instruct the yaw motor to adjust the yaw angle of the nacelle so that the axis of rotation of the turbine blades is directed into the wind.

The control system also may receive feedback from the wind turbine in the form of information as to the operating condition of the wind turbine received from operating condition sensors. The operating conditions may include mechanical conditions of the wind turbine, such as the rotational speed of the rotor, the temperature of a bearing, electrical potential and electrical current produced by the electrical generator, or the temperature or lubrication status of the speed increaser. The monitored operating conditions also may include information verifying whether actuator commands have been properly implemented, such as the rotational location of the rotor, yaw angle, blade lag angle about the lag/fold hinge, feather angle about the feathering hinge and status of the clamp. The control system may consider the operating condition information received from condition sensors in conjunction with weather information received from weather sensors in determining whether to command the first or second position for the rotor and in determining optimal settings for each actuator for efficient wind turbine operation.

The sensors may communicate with the control system and the control system may communicate with the mooring system by any convention means, including a wired connection, radio, cellular telephone technology, communication by visible light or other radiation, and by any other conventional means.

Yaw Bearings

The yaw bearings of the Invention connect the nacelle to the tower and allow the horizontal axis of rotation of the turbine blades to rotate about the tower. The yaw bearings of the Invention comprise a first, or upper, yaw bearing and a second, or lower yaw bearing. The first yaw bearing is located at the top of the tower and between the nacelle and the tower. The second yaw bearing is circular in shape and is located about the tower in a spaced apart relation with the first yaw bearing. The second yaw bearing supports at least one strut. The strut is attached to the nacelle between the first yaw bearing and the turbine blade hub. The strut supports much of the weight of the rotor, hub, nacelle and associated structures.

Use of the second yaw bearing allows a substantial portion of the weight of the blades, hub and nacelle to be supported as an axial load by the second, or lower, yaw bearing and avoids the extreme loading of the first yaw bearing due to the leverage of an off-center load.

DESCRIPTION OF AN EMBODIMENT

The Invention is a wind turbine electrical generator for use in low wind conditions.

Figure 1:
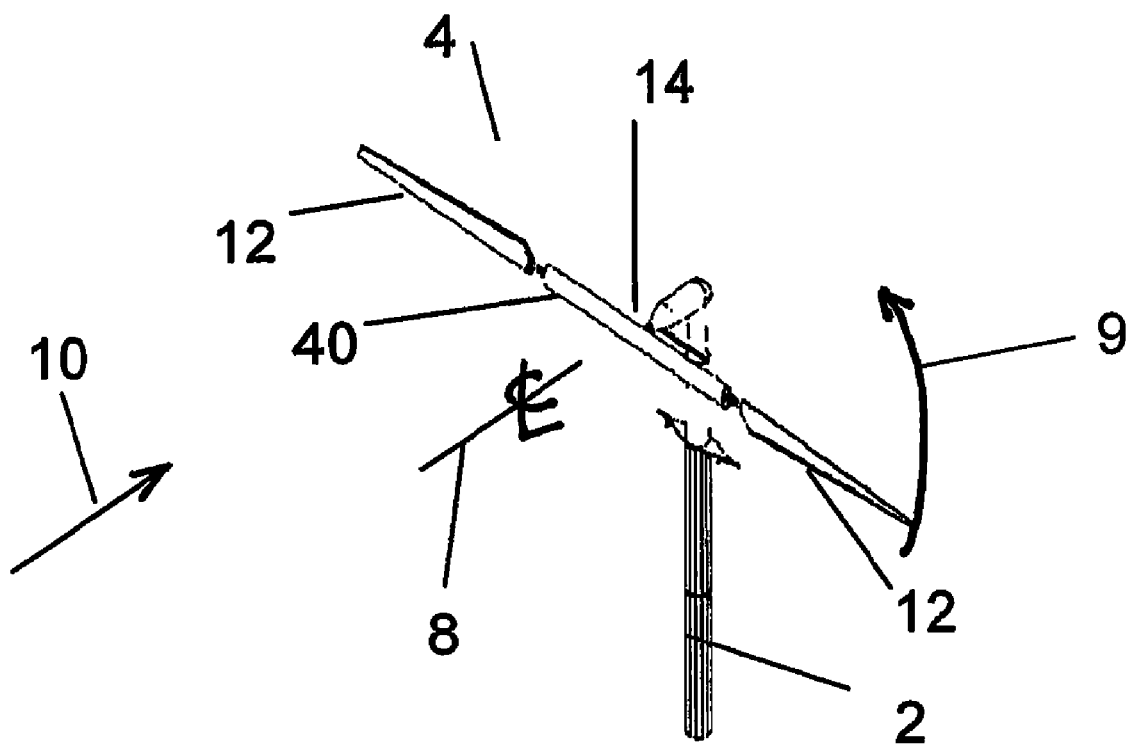
FIG. 1 is a perspective view of the wind turbine of the Invention.
Figure 2:
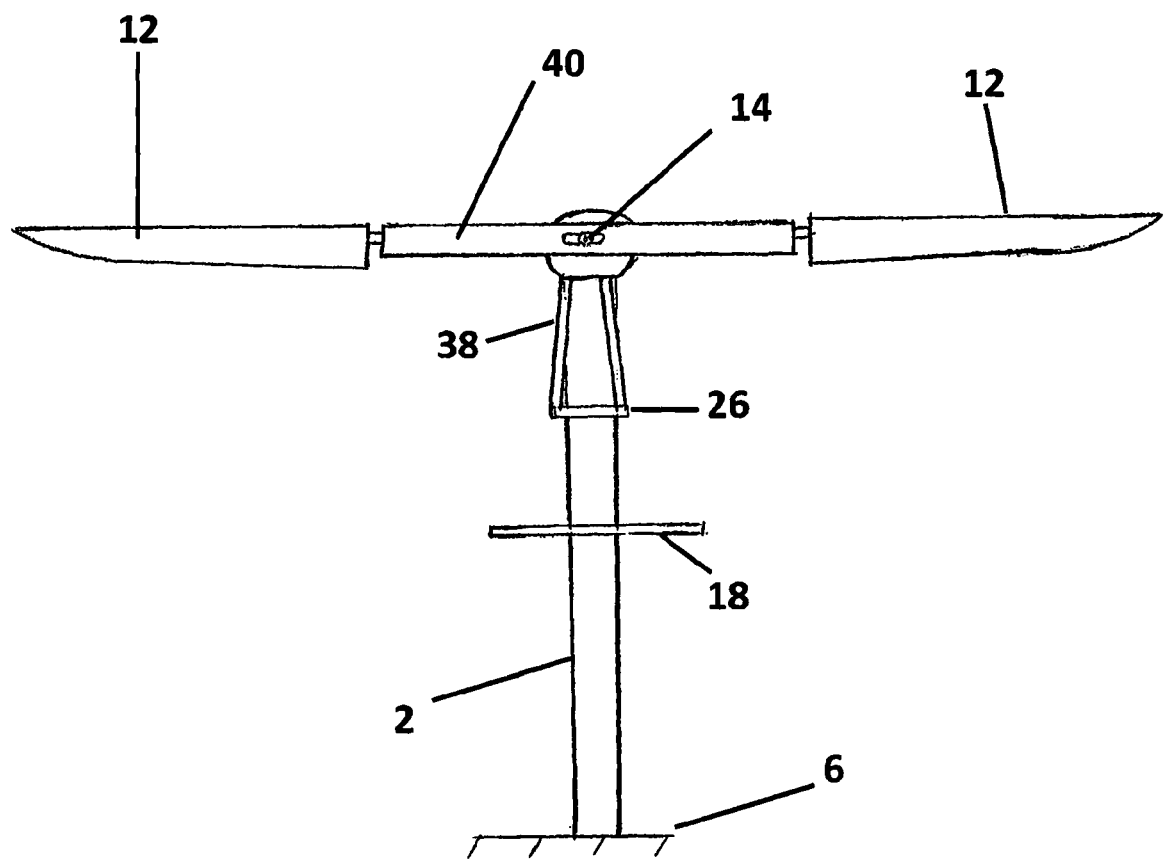
FIG. 2 is front view of the wind turbine in the first, or deployed, position.
Figure 3:
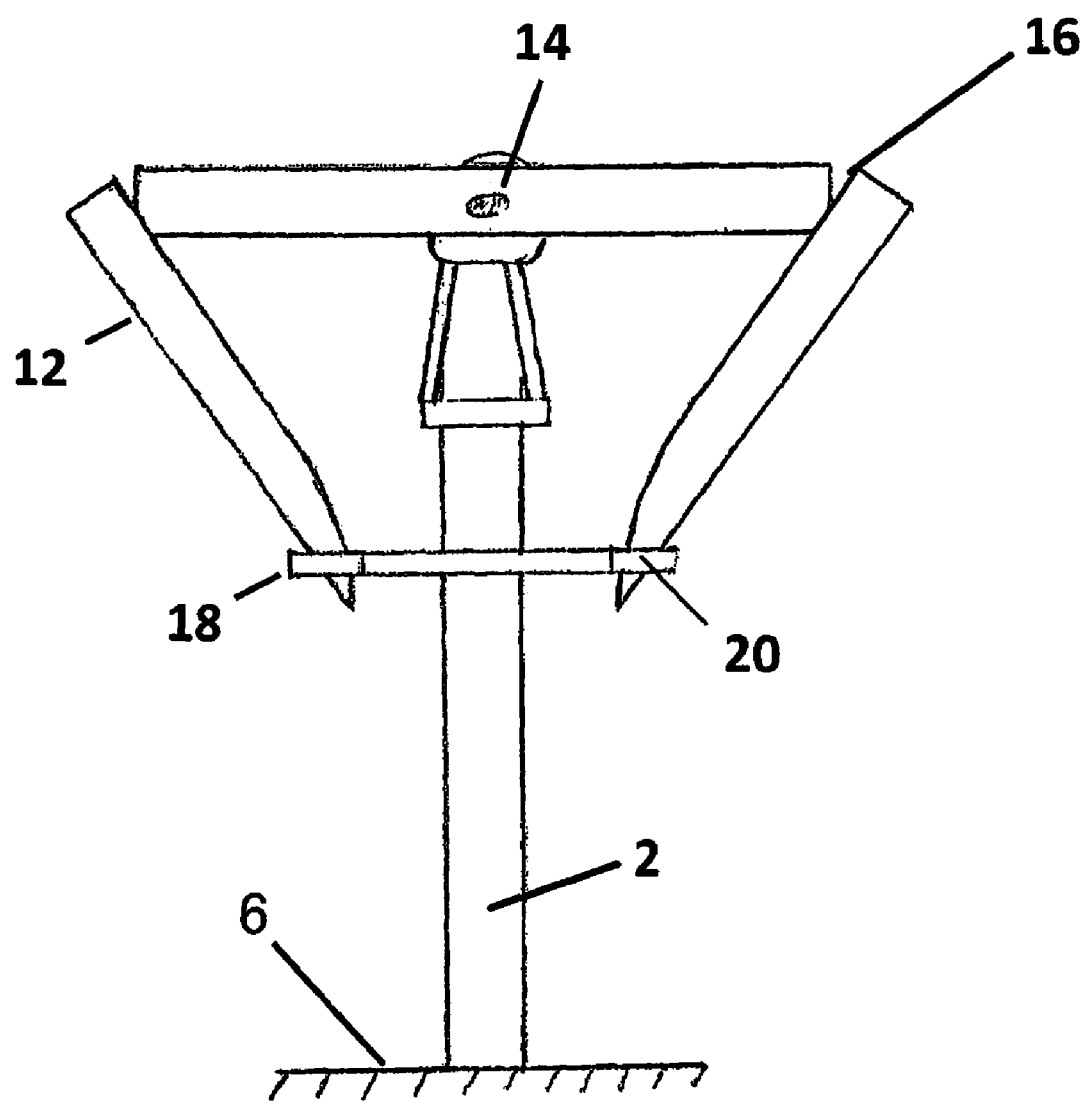
FIG. 3 is a front view of the wind turbine in the second, or moored, position.

As shown by FIGS. 1-3, the wind turbine of the Invention features a tower 2 and a wind turbine rotor 4 supported by the tower 2 above the surface of a ground 6. The wind turbine rotor 4 has an axis of rotation 8 and is of the horizontal upwind type; that is, the axis of rotation 8 is generally horizontal with respect to the Earth and the wind turbine rotor 4 is located upwind of tower 2. The Invention also may be applied to horizontal downwind-type wind turbines.

The wind turbine rotor 4 includes turbine blades 12 and is configured to rotate in direction 9 in response to a wind 10. The wind turbine rotor 4 has a first position, illustrated by FIGS. 1 and 2, and a second position, illustrated by FIG. 3. In the first position, also referred to herein as the 'deployed position,' wind turbine blades 12 are radially arrayed about a hub 14 and configured for rotation in response to wind 10. In the second position, also referred to herein as the 'moored position,' wind turbine blades 12 are folded about a mooring hinge 16. The folded turbine blades 12 are moored to a cradle 18 that is attached to tower 2. The folded turbine blades 12 are retained in the cradle 18 by clamps 20.

Figure 4:
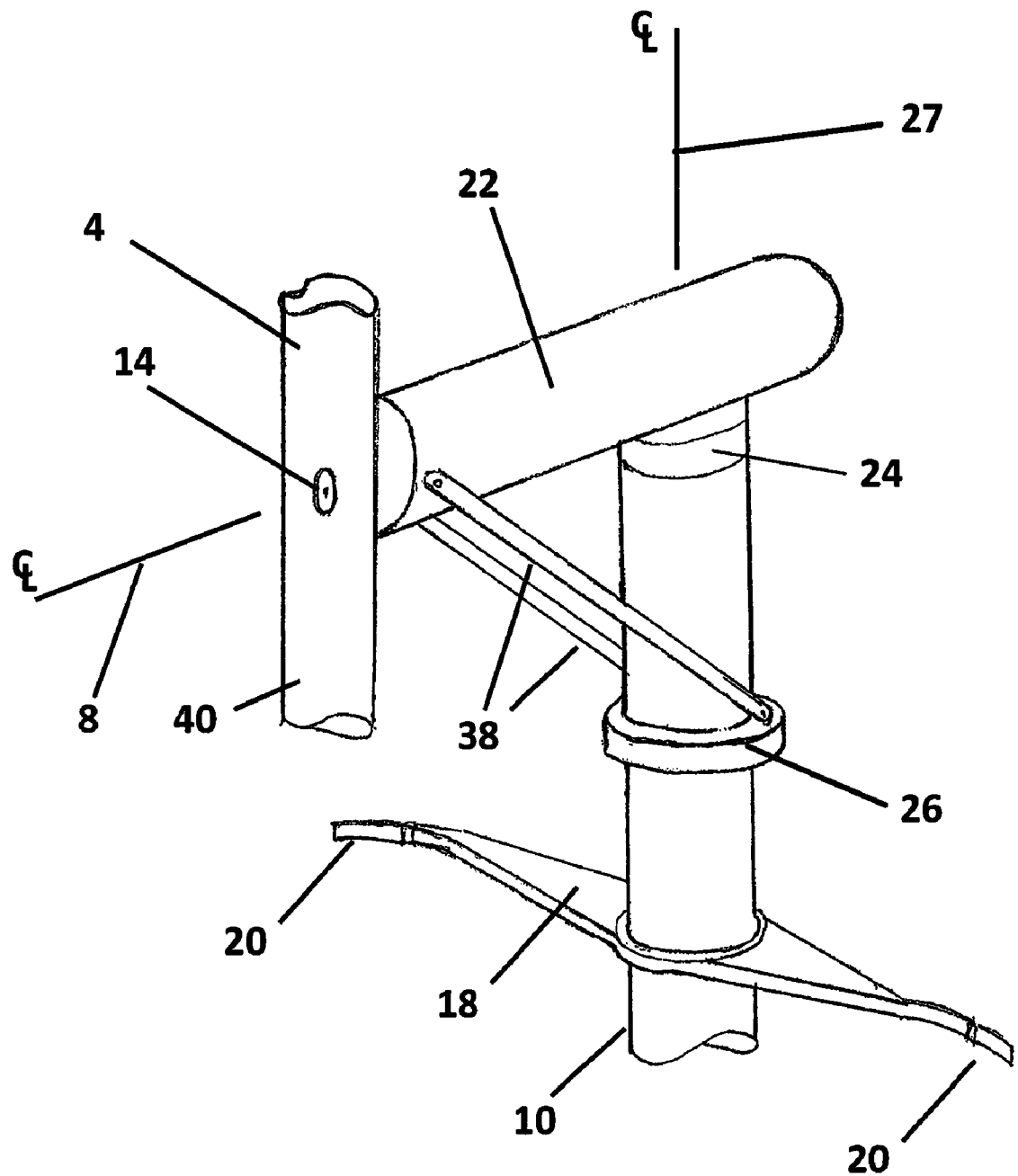
FIG. 4 is a detail perspective view of the yaw bearings, nacelle, cradle and clamps

As shown by FIG. 4, the wind turbine includes a nacelle 22 supported at the top of tower 2 by upper and lower yaw bearings 24, 26. Upper and lower yaw bearings 24, 26 allow nacelle 22, and hence axis of rotation 8, to rotate about a vertical yaw axis 27. Rotation of nacelle on yaw bearings 24, 26 about vertical yaw axis 27 allows axis of rotation 8 to be directed into the wind 10. Lower yaw bearing 26 is annular and is arrayed around tower 2 between the ground 6 and upper yaw bearing 24. A pair of struts 38 attaches the lower yaw bearing 26 and the nacelle 22 between upper yaw bearing 24 and rotor 4. Struts 38 transfer a portion of the load imposed by rotor 4, hub 14 and nacelle 22 to the lower yaw bearing 26. Struts 38 and lower yaw bearing 26 relieve upper yaw bearing 24 of the very high local loads resulting from the cantilevered weight of the rotor 4, nacelle 22, and associated structures.

Cradle 18, shown by FIGS. 2, 3 and 4, receives blades 12 when the blades 12 move from the first position to the second position. Clamp 20 secures blades 12 within cradle 18. Clamp 20 has a released position illustrated by FIG. 4 and a clamped position illustrated by FIG. 3. In the clamped position, the clamp 20 secures blades 12 within cradle 18. In the released position, clamps 20 do not engage blades 12. In the released position, blades 12 are supported by cradle 18 but are not secured to cradle 18.

Figure 5:
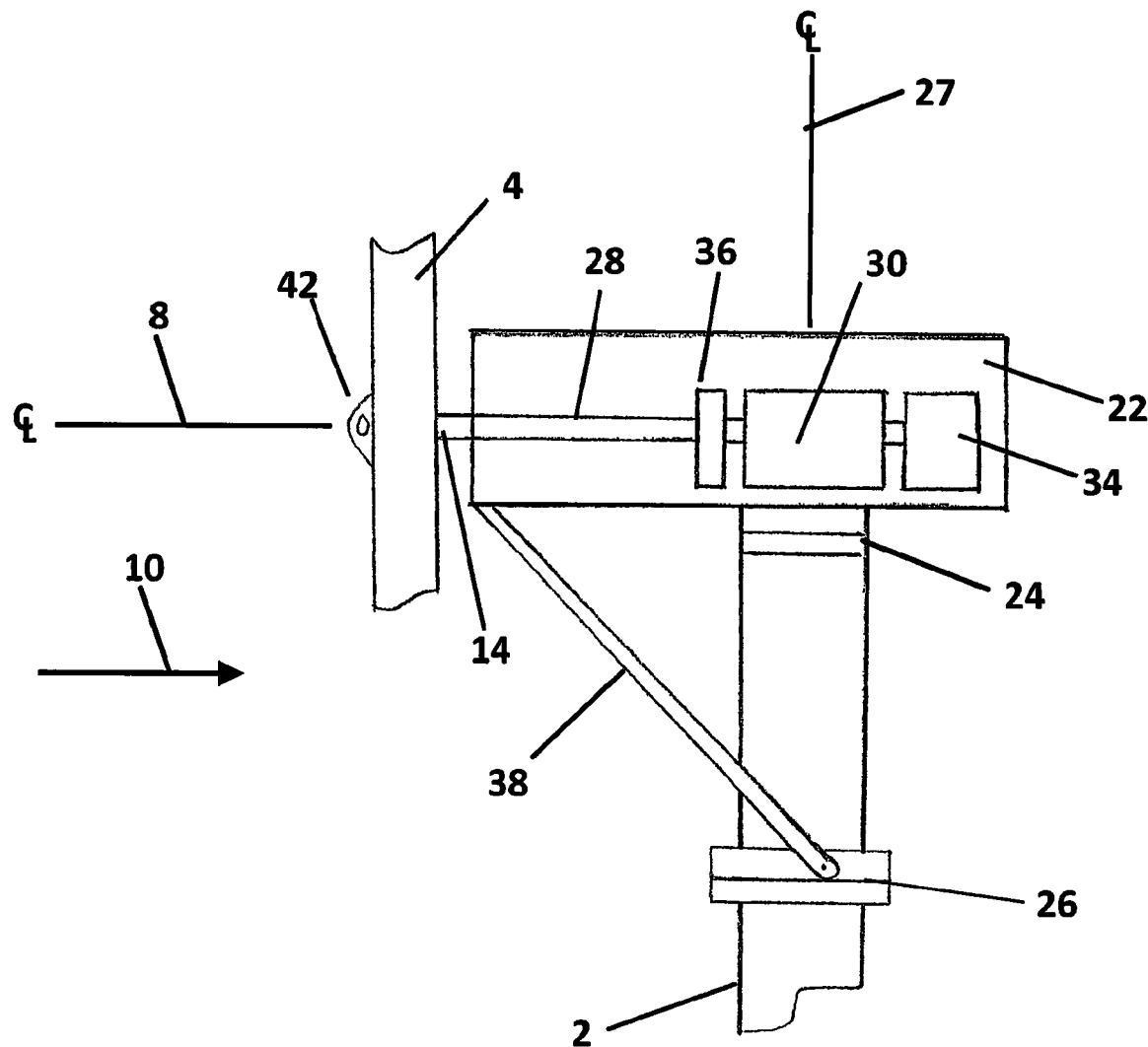
FIG. 5 is a schematic diagram of the nacelle.

As shown schematically by FIG. 5, rotor 4 turns a low-speed shaft 28 contained within nacelle 22. Low-speed shaft 28 rotates at a design speed of 11 rpm and turns an input of speed increaser 30. Speed increaser 30 is a gear train that translates the low speed rotation of the low-speed shaft 28 to a high speed rotation of a high speed shaft 32. High speed shaft 32 is connected to an electrical generator 34, which transforms the rotational energy of the rotor 2 into electrical energy. Conventional slip ring connectors connect the output 124 (FIG. 14) of the electrical generator 34 to an electrical load 126. A brake/indexer 36 allows the rotor 4 to be stopped for mooring. The speed increaser 30 and brake/indexer 36 generate substantial torque loads on the nacelle 22 and hence tower 2. The speed increaser 30 and brake/indexer 36 are located in nacelle 22 as close to the upper yaw bearing 24 as possible, thereby reducing torsional loads on nacelle 22 as much as possible.

Figure 6:
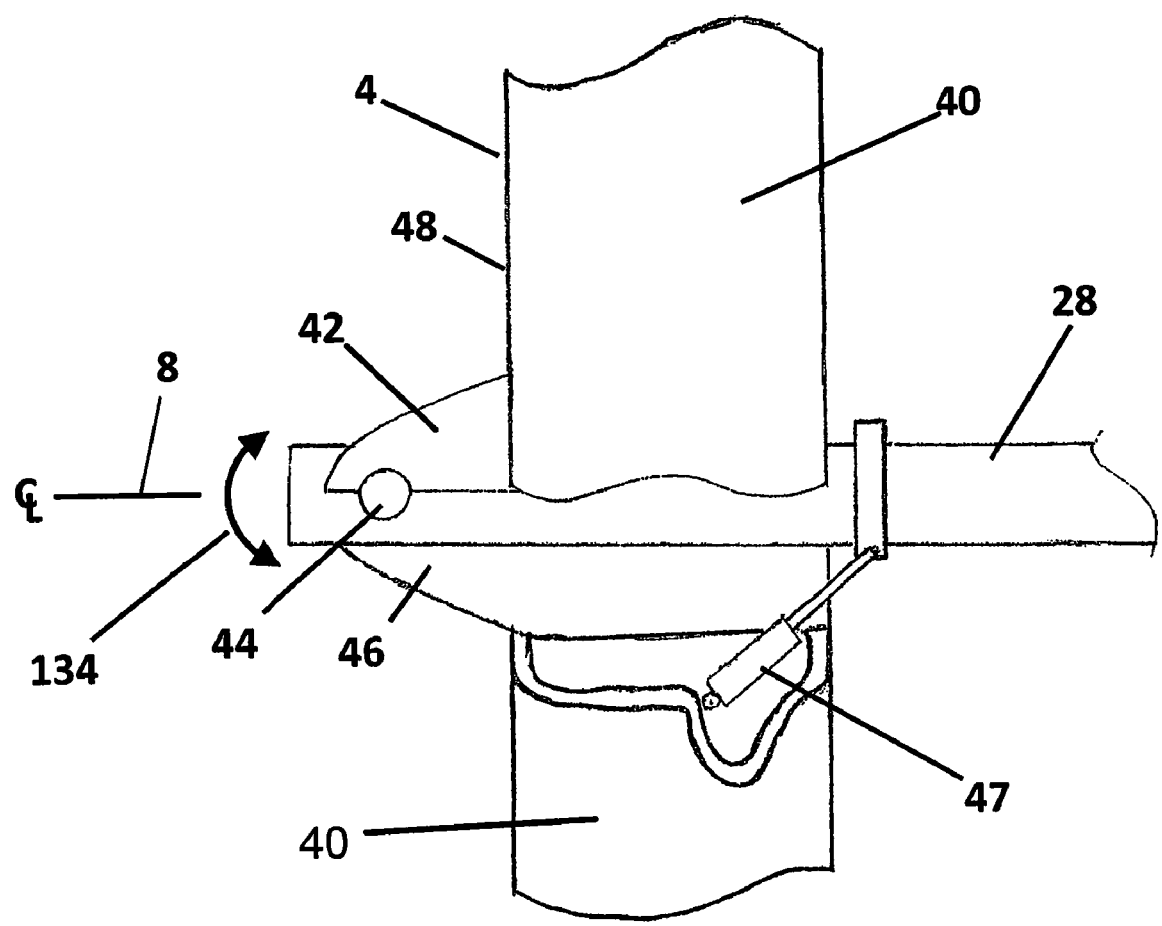
FIG. 6 is a detail cutaway view of the teetering hub.
Figure 7:
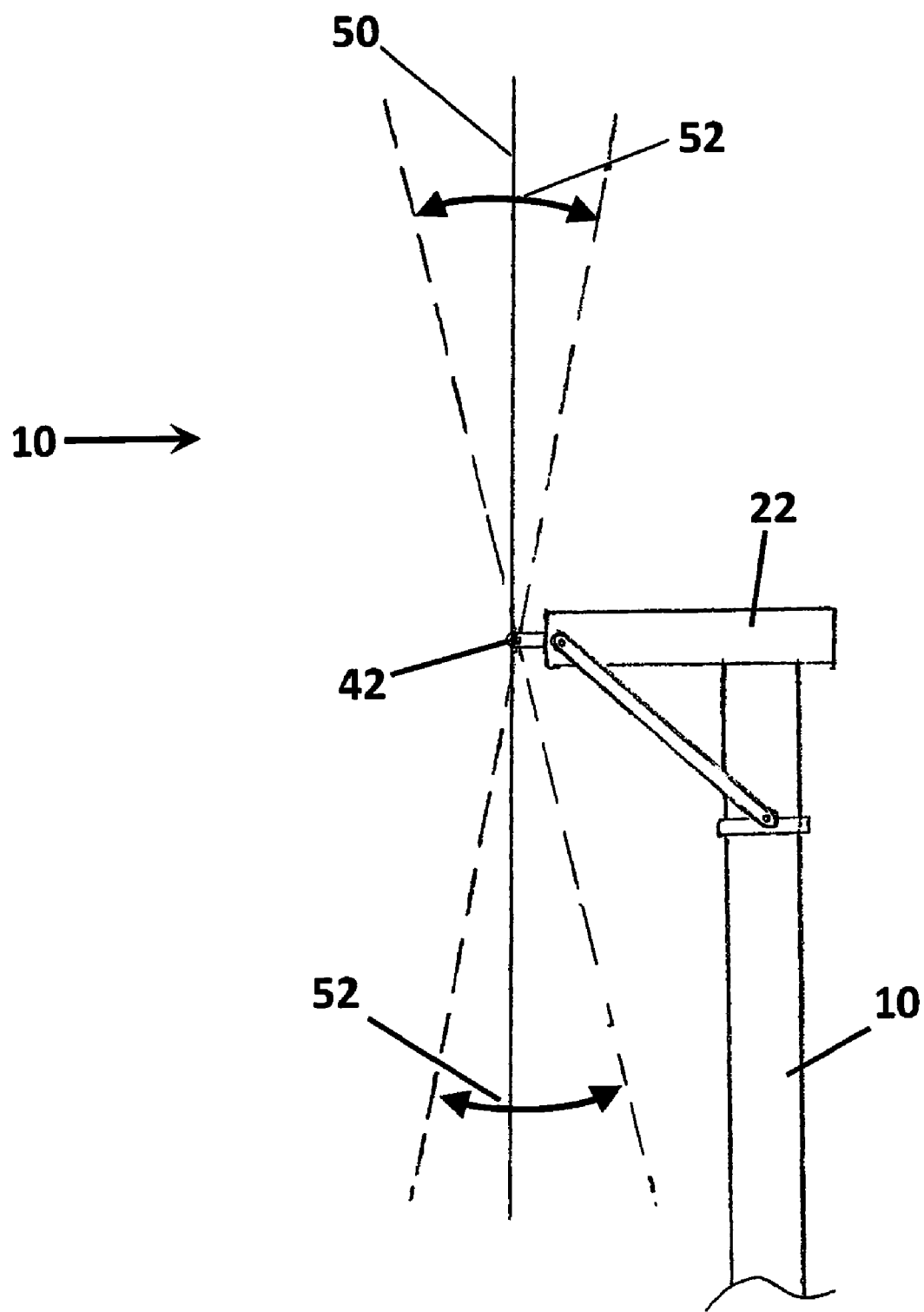
FIG. 7 is a schematic side view of the apparatus showing the plane of rotation of the rotor.
Figure 8:
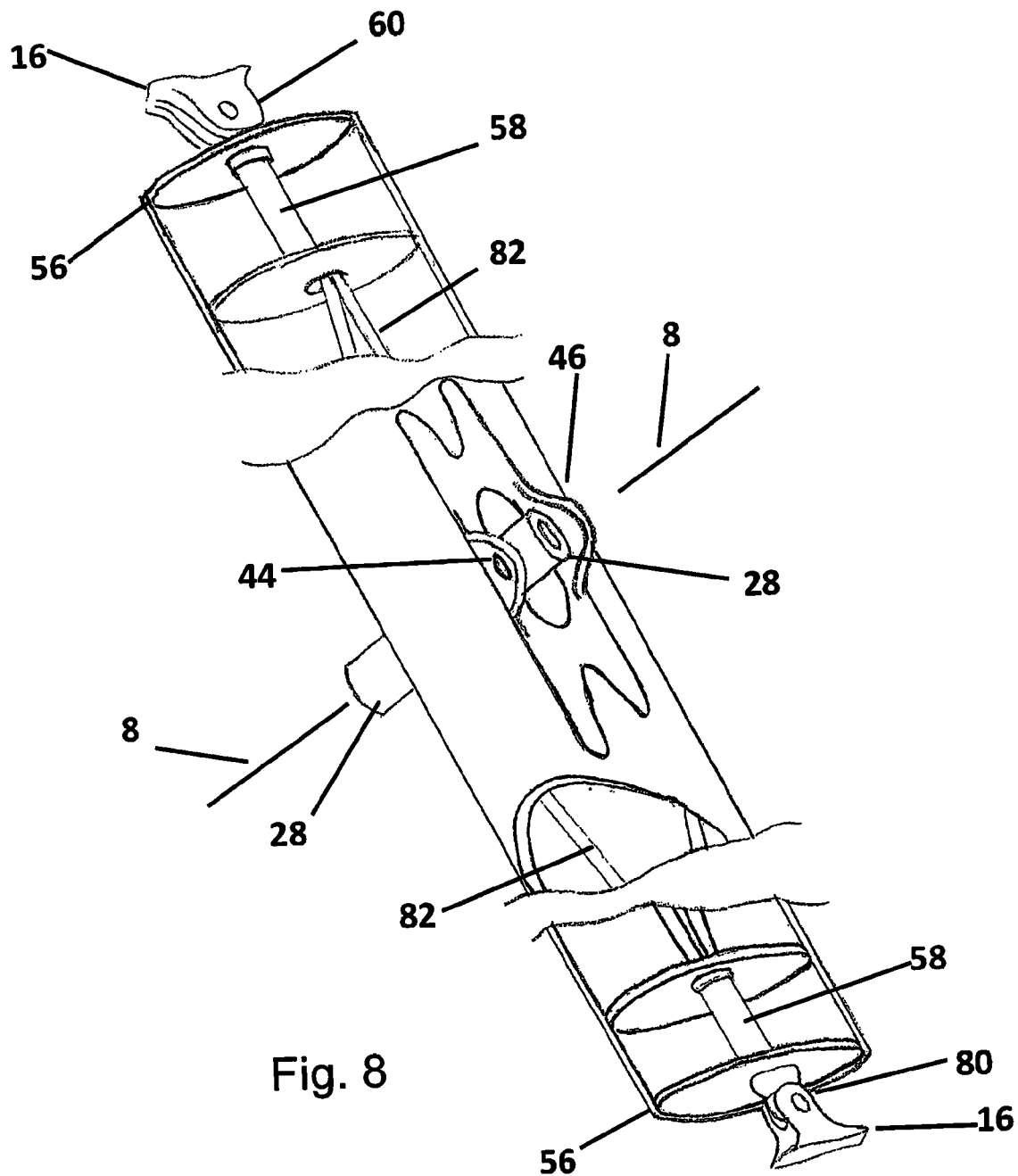
FIG. 8 is a detail cutaway view of the hub beam.

The rotor 4 illustrated by FIGS. 1, 2 and 3 is composed of three principal components—two turbine blades 12 and the hub beam 40. Hub beam 40 and each blade 12 are approximately of equal length. A design length of 127 feet will allow the hub beam 40 and blades 12 to be transported by truck without limitation while allowing an assembled rotor 4 of approximately 400 feet in diameter. FIGS. 6 through 8 illustrate the hub beam 40. The hub beam 40 is a structural member that holds the turbine blades 12 in a spaced apart relation with respect to hub 14.

FIG. 6 is a partial cutaway view of hub 14. The hub 14 comprises a teetering hinge 42 and is disposed at approximately the midpoint along the longitudinal dimension of the hub beam 40. Teetering hinge 42 is defined by a barrel nut 44 joining low-speed shaft 28 and bracket 46. Bracket 46 is rigidly attached to hub beam 40. Teetering hinge 42 is located on the upwind side 48 of and in a spaced apart relation to hub beam 40. The motion of hub beam 40 and blades 12 about the teetering hinge 42 is damped by dampers 47 that may be elastomeric or hydraulic.

As shown by FIGS. 6 and 7, teetering hinge 42 allows rotor 4 to 'flap;' that is, to move in a direction normal to the plane 50 swept by the rotating rotor 4. The direction of allowable movement is illustrated by arrows 54 on FIG. 7. The teeter angle 134 of FIG. 6 is the angular difference between a plane 50 normal to the axis of rotation 8 and the actual angular location of rotor 4 with respect to the axis of rotation 8. The limits of allowable teeter angle 134 are illustrated by the dashed lines of FIG. 7. Teetering hinge 42 allows the rotor 4 to react to wind gusts and uneven forces acting on the rotor 4 as it rotates. The motion of the rotor 4 about the teetering hinge 42 is dampened by dampers 47 and by the mass of the rotating rotor 4. The flapping motion of rotor 4 about teetering hinge 42 spreads out and hence reduces the peak wind forces acting on the blades 12, hub beam 40, hub 14, nacelle 22 and associated structures.

Figure 9:
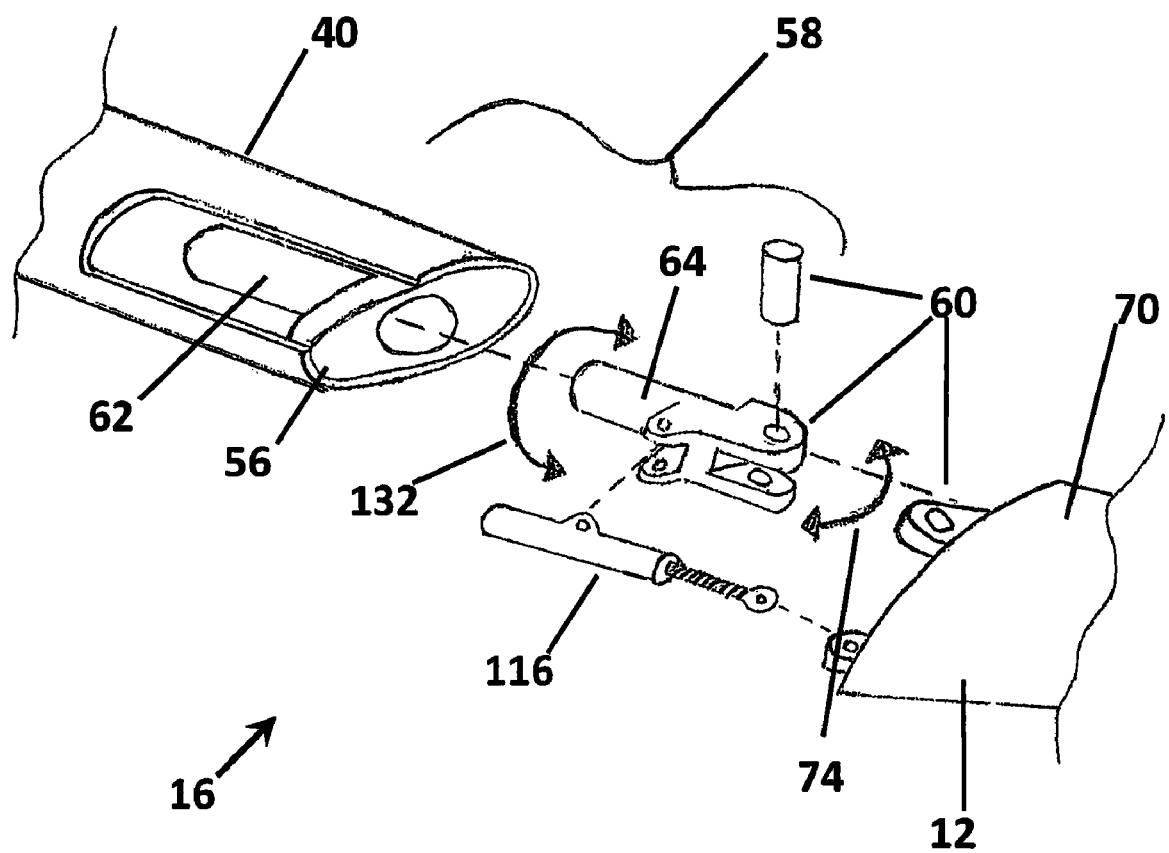
FIG. 9 is an exploded view of the feathering and lag/fold hinges.

The hub beam 40 is illustrated by FIGS. 8 and 9. Brackets 46 are attached to the hub beam 40 at its longitudinal center. Hub beam 40 has two opposing ends 56. One of the turbine blades 12 is attached to each end 56 of the hub beam 40. The purpose of the hub beam 40 is to support the turbine blades 12 in a spaced apart relation about the axis of rotation 8 of the rotor 4.

The hub beam 40 is shaped to reduce wind resistance to its rotation. Hub beam 40 does not provide significant lift and the force of the wind 10 against the hub beam 40 does not add significantly to the power generated by the turbine blades 12.

Figure 10:
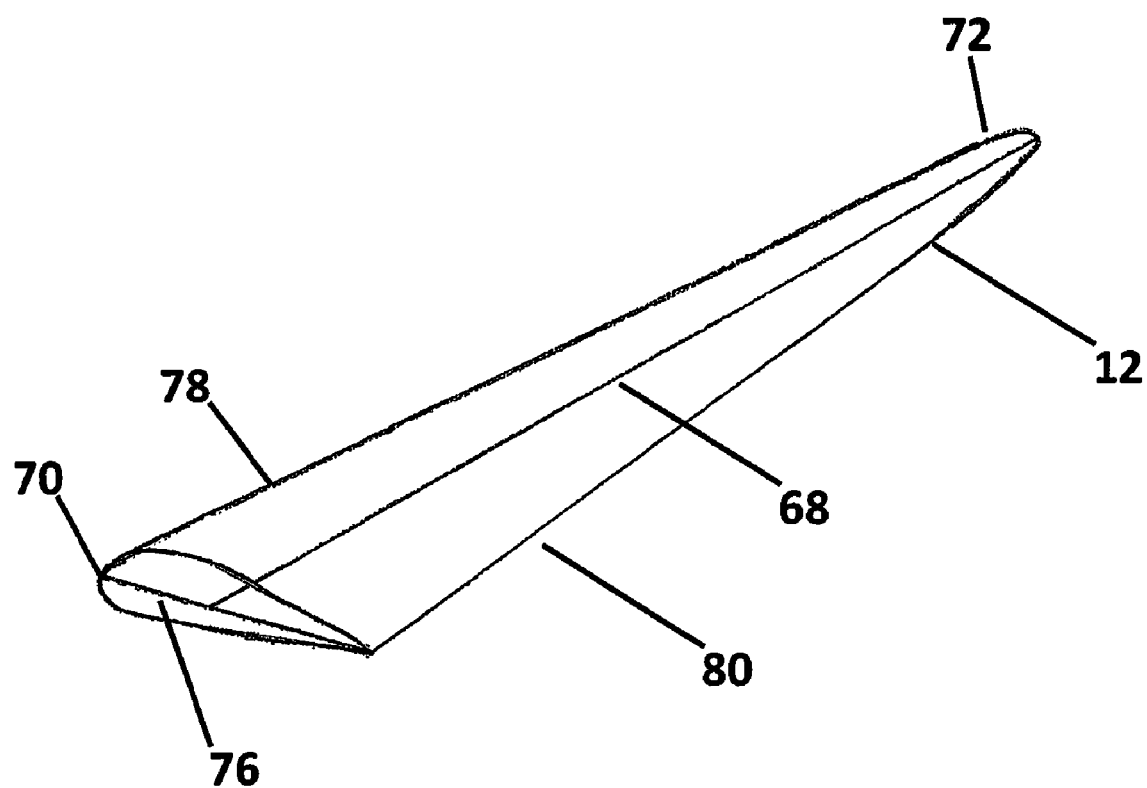
FIG. 10 is a perspective view of a turbine blade.

The hub beam end 56 is attached to the two turbine blades 12 by a mooring hinge 16. Mooring hinge 16 comprises a feathering hinge 58 and a lag/fold hinge 60, illustrated by the exploded view of FIG. 10. Feathering hinge 58 includes a female portion 62 affixed to the end 56 of hub beam 40. Feathering hinge 58 also includes a mating male portion 64 that rotatably engages female portion 62. Feathering hinge 58 allows blade 12 to rotate about a blade longitudinal dimension 68 of the blade 12, as shown by FIG. 10, to change the feather angle 132 of the turbine blade 12, allowing the pitch or the angle of attack of the rotating blade 12 to be controlled. The blade longitudinal dimension 68 runs generally along a center of lift from the blade root 70 to the blade tip 72. A pair of hydraulic screw jacks is arrayed at the end 56 of hub beam 40 and attach the female 62 and male 64 portions of feathering hinge 58 and control the feather angle 132 of the feathering hinge 58 and hence the blade 12.

Lag/fold hinge 60 is a pin connection between blade 12 and male portion 64 of feathering hinge 58. Lag/fold hinge 60 allows blade 12 to pivot in a plane generally coextensive with the chord 76 of blade 12 to select a lag angle 74. The chord 76 generally is a line from the leading edge 78 to the trailing edge 80 of blade 12. A lag/fold effector 116 in the form of a hydraulic screw jack joins the wing root 70 and the male portion 64 of the feathering hinge 58, controlling the lag angle 74 of the turbine blade with respect to the hub beam 40.

Hub beam 40 features a pair of opposing hub beam ends 56, to which a pair of opposing feathering hinges 58 and a pair of lag/fold hinges 60 are attached. A pair of blades 12 is supported by the opposing lag/fold hinges 60.

Figure 11:
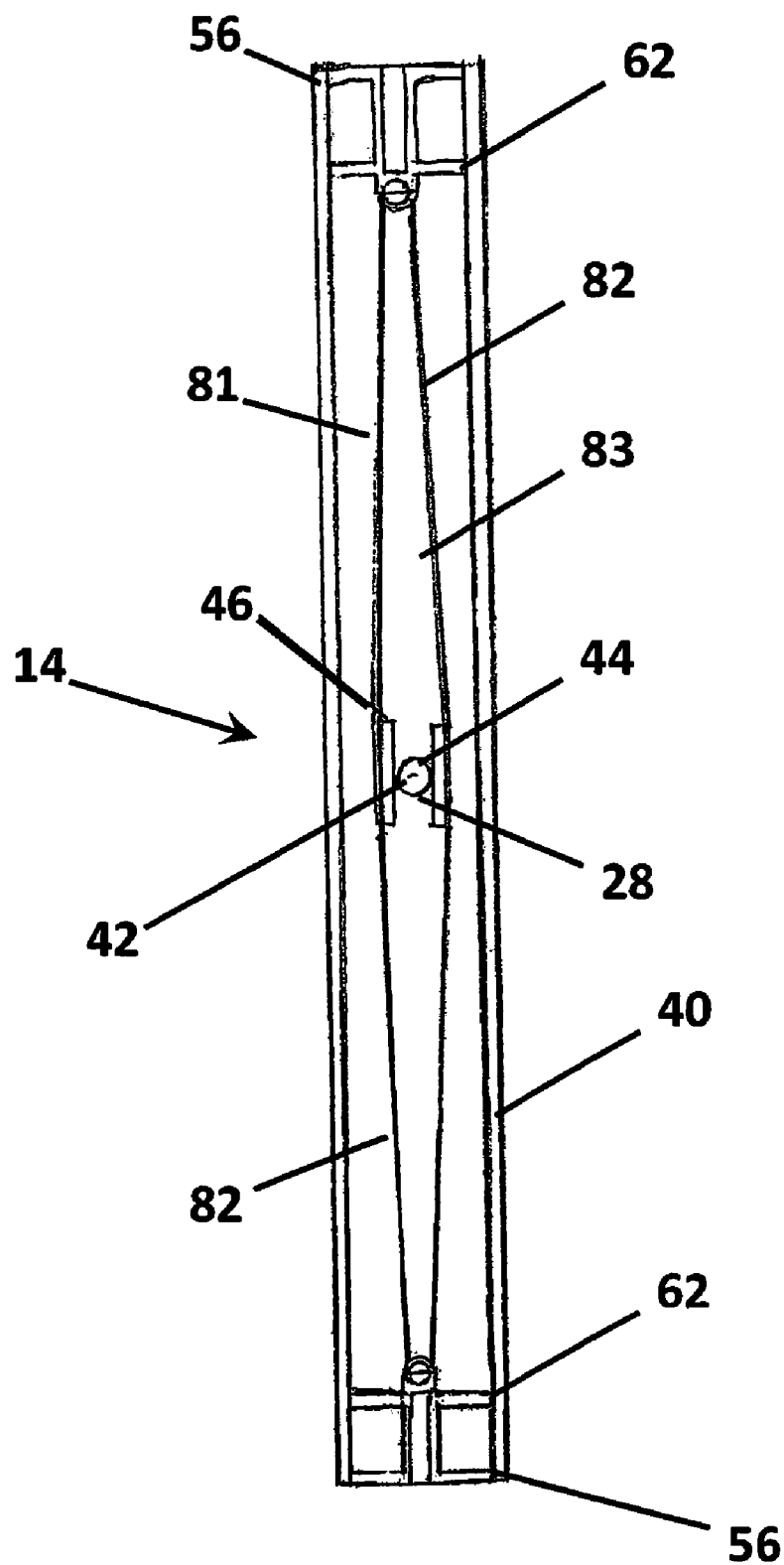
FIG. 11 is a section view of the hub beam.
Figure 12:
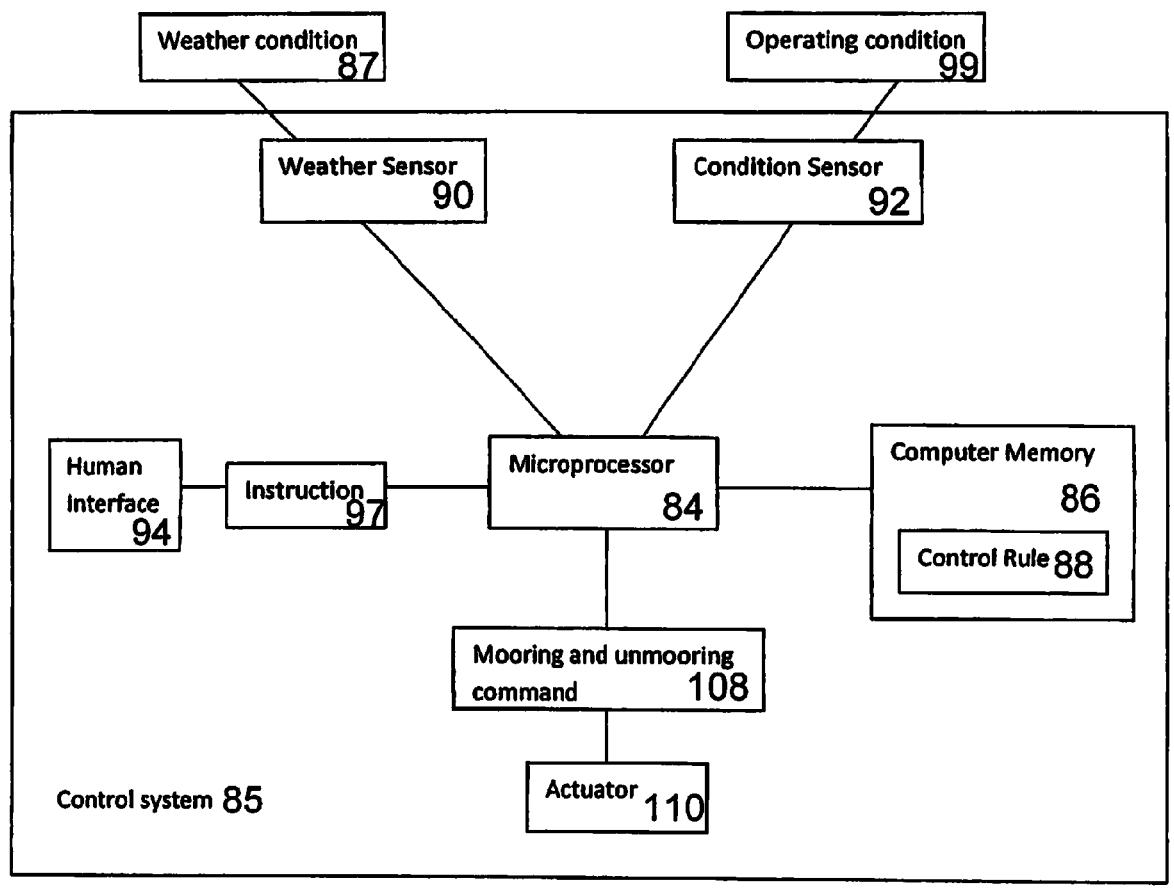
FIG. 12 is a schematic diagram of the control system.

FIG. 11 is a cross section of the hub beam 40. The two opposing female portions 62 of opposing feathering hinges 58 are joined one to the other by a strap 82. Strap 82 preferably is formed in a loop 83 and composed of a para-aramid synthetic fiber 81, such as Kevlar®. The strap 82 extends the length of the hub beam 40, joining one female portion 62 to the other female portion 62. The strap 82 extends around the bracket 46 and low speed shaft 28. The strap 82 supports a portion of the weight of the blade 12 that is below the horizontal. When the rotor 4 is oriented vertically, which occurs twice for each revolution of blade 12, the strap 82 supports the entire weight of the blade 12 that is closer to the ground 6. The strap 82 also supports the centrifugal forces creating by the rotating blades 12.

Use of strap 82 eliminates the need for a connection between the female portion 62 of feathering hinge 58 and the end 56 of hub beam 40 that will support the weight of the turbine blade 12 and the centrifugal force generated by the rotating blades 12 in tension. Use of the strap 82 transfers what would otherwise be a tension load on the end 56 of the hub beam 40 into a compression load on the opposing end 56 of the hub beam 40. The compression load is easier for the hub beam 40 to support, allowing a lighter hub beam 40 and female portion 62 than would otherwise be possible.

Use of hub beam 40 combined with feathering hinge 58 and lag/fold hinge 60 allows blades 12 to be moored to tower 2. The plane of rotation 50 (FIG. 7), defined by the sweep of the rotating blades 12, is in a spaced-apart relation to the tower 2 and upwind of the tower 2. The spaced-apart relation between the plane of rotation 50 and the tower 2 is necessary to prevent a strike by a blade 12 against the tower 2 due to 'coning' of the blades 12; that is, due to deformation of the blades 12 in the downwind direction due to the force of the wind 10 on the blades 12. To moor to the tower 2, the blades 12 must traverse the space between the plane of rotation 50 and the cradle 18 on the tower 2. The hub beam 40 physically separates the feathering and lag/fold hinges 60, 62 from the nacelle 22, preventing mechanical interference between the folding blades 12 and the nacelle 22. Placing the blades 12 at the ends 56 of the hub beam 40 also reduces the length of the blade 12 subject to significant coning, allowing the blades 12 to be lighter and more flexible than would otherwise be possible. Finally, use of the feathering and lag/fold hinges 60, 62 in combination allows the blades 12 to move in three dimensions so that the blades 12 can traverse the distance between the plane of rotation 50 and the tower 2.

Use of the hub beam 40 also allows the rotor 4 to be more efficient in a low speed wind than would otherwise be possible. The blade 12 defines an annulus as it rotates. The larger the diameter of the rotor 4, the more wind energy that can be captured by the wind turbine; however, the longer the blade 12, the heavier and more difficult and expensive to make, transport and operate the blade 12 becomes. The use of the hub beam 40 allows a large and efficient turbine to be constructed with relatively short, light and inexpensive blades 12.

Control System

The control system 85 to operate the wind turbine is shown schematically by FIGS. 12-17. During the operation of the wind turbine to generate electrical power, the control system 85 regulates the feather angle 132 of the turbine blades 12, the lag angle 74 of the blades 12, and the yaw 136 of the nacelle 22 to efficiently extract power from the incident wind 10 while preventing an over-speed condition of the rotor 4, excessive vibration, or other operating condition that exceeds an operating parameter of the wind turbine. If the control system 85 or a human operator determines that an operating limitation of the turbine may be exceeded, the control system 85 will cause the turbine blades 12 to be stopped, folded and moored to the tower 2, preserving the wind turbine from damage.

Figure 15:
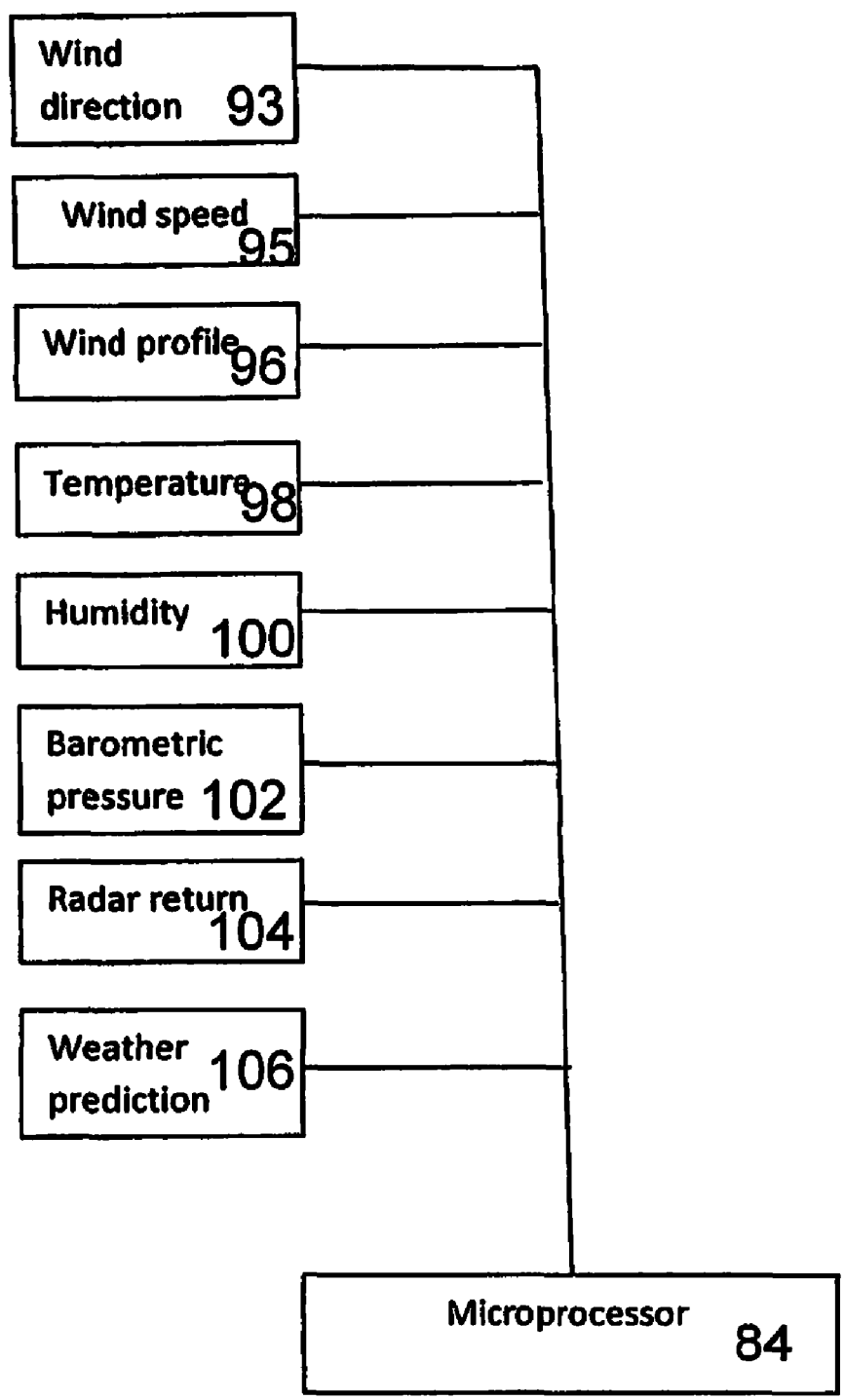
FIG. 15 is a schematic diagram of monitored weather conditions.

The control system 85 includes a microprocessor 84. A computer memory 86 is accessible to the microprocessor and stores a control rule 88, which also is accessible to microprocessor 84. At least one weather sensor 90 is operably connected to the microprocessor 84. Weather sensor 90 is selected to detect a weather condition 87. As illustrated by FIG. 15, the detected weather condition 87 can be any or all of wind direction 93, wind speed 95, wind profile 96, air temperature 98, humidity 100, barometric pressure 102, the return of a radar transmission 104 or a weather prediction 106 from a human or automated weather forecaster.

Wind direction 93 is necessary so that the control system 85 can orient the nacelle 22 in yaw 136 and hence point the axis of rotation 8 into wind 10. Wind direction 93 may be measured by many vanes located in the vicinity of the wind turbine 2. Wind speed 95 is necessary to select the appropriate feather angle 132 and hence blade pitch 114 to extract power efficiently. Wind speed 95 also is necessary to determine whether an event of excess rotor speed 128 or excess forces on the rotor 4 is likely to occur, requiring that the blades 12 be moved to the second position. Wind profile 96 is the differences in wind speed and direction at different altitudes and may be determined by radar or sonar wind profilers. Since wind turbines for commercial power generation are large, the wind speeds 95 and direction 93 that will encounter the top of the rotor 4 may be different from those that encounter the bottom of the rotor 4. The wind profile 96 may be considered by the control system 85 in determining whether to deploy or fold the blades 12 and in selecting feather angle 132, lag angle 130 and yaw 136. Temperature 98 and humidity 100 can be useful to the control system 85 to predict whether unacceptable icing conditions may occur at the rotor 4. If the risk of icing is unacceptable, the control system 85 may determine to move blades 12 to the second position. Barometric pressure 102 may be used in conjunction with other parameters, for example temperature 98, humidity 100, wind speed 95, wind direction 93 to predict weather conditions 87 at the rotor 4 in the future, and hence whether blades 12 should be moved to or maintained in the first or second position.

The microprocessor 84 also may receive a weather prediction 106 made by a human meteorologist or by an automated forecasting system and the microprocessor may determine whether to move the rotor 4 between the first and second positions based on that prediction 106. For example, the operator of the wind turbine may subscribe to a weather forecasting service and may base a decision on the provided weather prediction 106. Weather sensors 90 may be operated by any person, including the National Weather Service or a third party provider of weather forecasting.

A human interface 94, such as a conventional display, keyboard and mouse, is in communication with the microprocessor 84 and allows a human operator to monitor the operation of the control system 85 and to issue an instruction 97 if the human operator concludes that a choice better than that made by the automated control system 85 is desirable.

For all of the monitored weather conditions 87, computer memory 86 may store weather conditions 87 data of the recent past for the purpose of predicting future weather conditions 87 and may determine whether to move or maintain the blades 12 in the first or second position based on the current weather conditions 87 compared with weather conditions 87 of the past.

Figure 13:
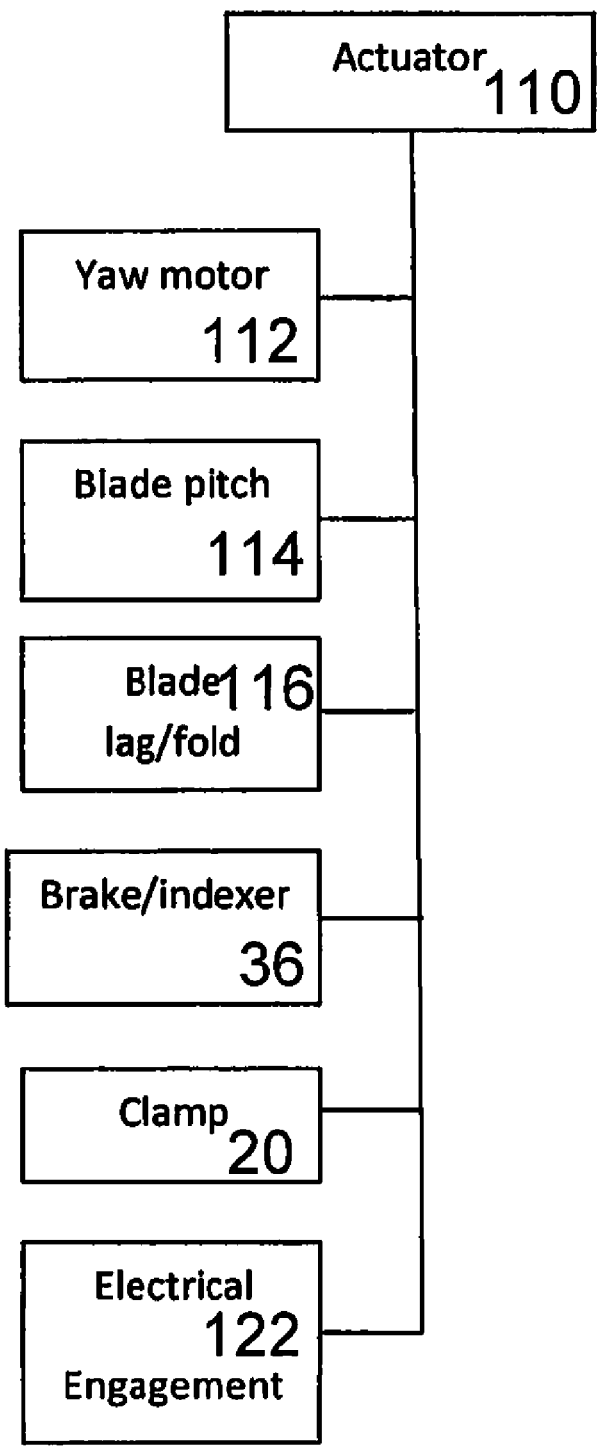
FIG. 13 is a schematic diagram of the actuators.

When the control system 85 or a human operator determines that the rotor 4 should move between the first (deployed) and the second (moored) positions, the microprocessor 84 will issue a moor or unmoor command 108 to actuator 110. As shown by FIG. 13, actuator 110 comprises a series of effectors that cooperate to move the rotor 4 between the moored and unmoored position. Those effectors include a yaw motor 112 that controls the yaw 136 of the nacelle 22, and hence the orientation of the axis of rotation 8. Yaw motor 112 is necessary to point the rotor 4 into the wind 10 and also to orient rotor 4 for mooring.

Effectors also include hydraulic screw jacks located at the ends 56 of the hub beam 40 and controlling the blade pitch 114, also referred to as feather angle 132, about the feathering hinge 58. Control of the feather angle 132 is necessary to select an appropriate angle of attack for blade 12 when blade 12 is in the first position and generating power. Control of the feather angle 132 also is necessary to stop and start the rotor 4 and to allow the three dimensional movement of blade 12 between the first and second positions.

Blade lag/fold effectors 116 are hydraulic screw jacks that control the angular position of the blade 12 about the lag/fold hinge 60, also referred to as lag angle 74, within the plane corresponding to chord 76 of blade root 70. Blade lag/fold effectors 116 also are necessary to allow three dimensional movement of blade 12 between the moored and unmoored positions.

Brake/indexer 36 is attached to the low-speed shaft 28 and allows the rotor 4 to be secured for mooring. Brake/indexer 36 also holds hub beam 40, and hence rotor 4, in a stationary position when blades 12 are in the second position.

Figure 14:
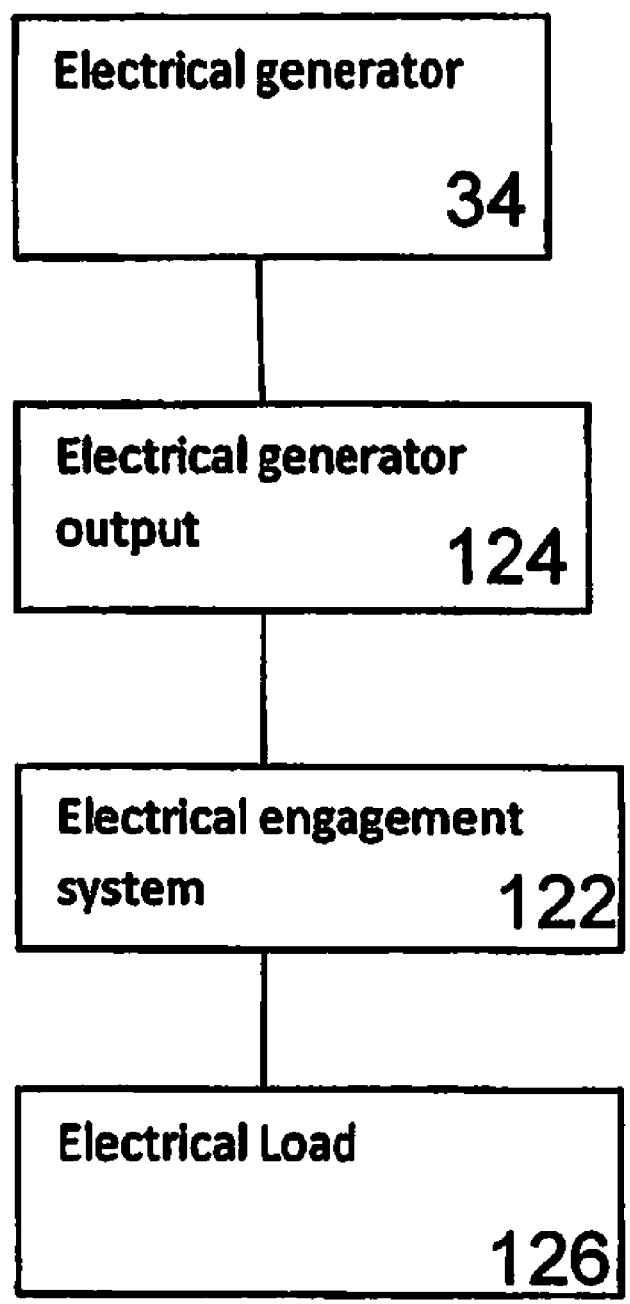
FIG. 14 is a schematic diagram of the power generation electrical system.

FIG. 14 is an electrical block diagram. From FIG. 14, electrical generator 34 has an output 124 of electrical power that is connected to the conventional electrical grid through the electrical engagement system 122, which also is conventional. The generator 34 supplies electrical load 126. Electrical engagement system 122 takes electrical generator 34 off line when rotor 4 is to be stopped or if rotor 4 is not generating adequate electrical power due to low wind 10 or other conditions. When the electrical engagement system 122 takes the electrical generator 34 off-line, electrical generator 34 is electrically separated from the utility power supply grid and the electrical load 126 is removed from generator 34. When the generator 34 can be re-connected to the grid, such as when the wind 10 speed is sufficiently high and the rotor 4 is turning at a sufficient rate, the electrical engagement system 122 will synchronize the generator 34 and the grid and electrically connect the generator 34 to the load 126.

Figure 16:
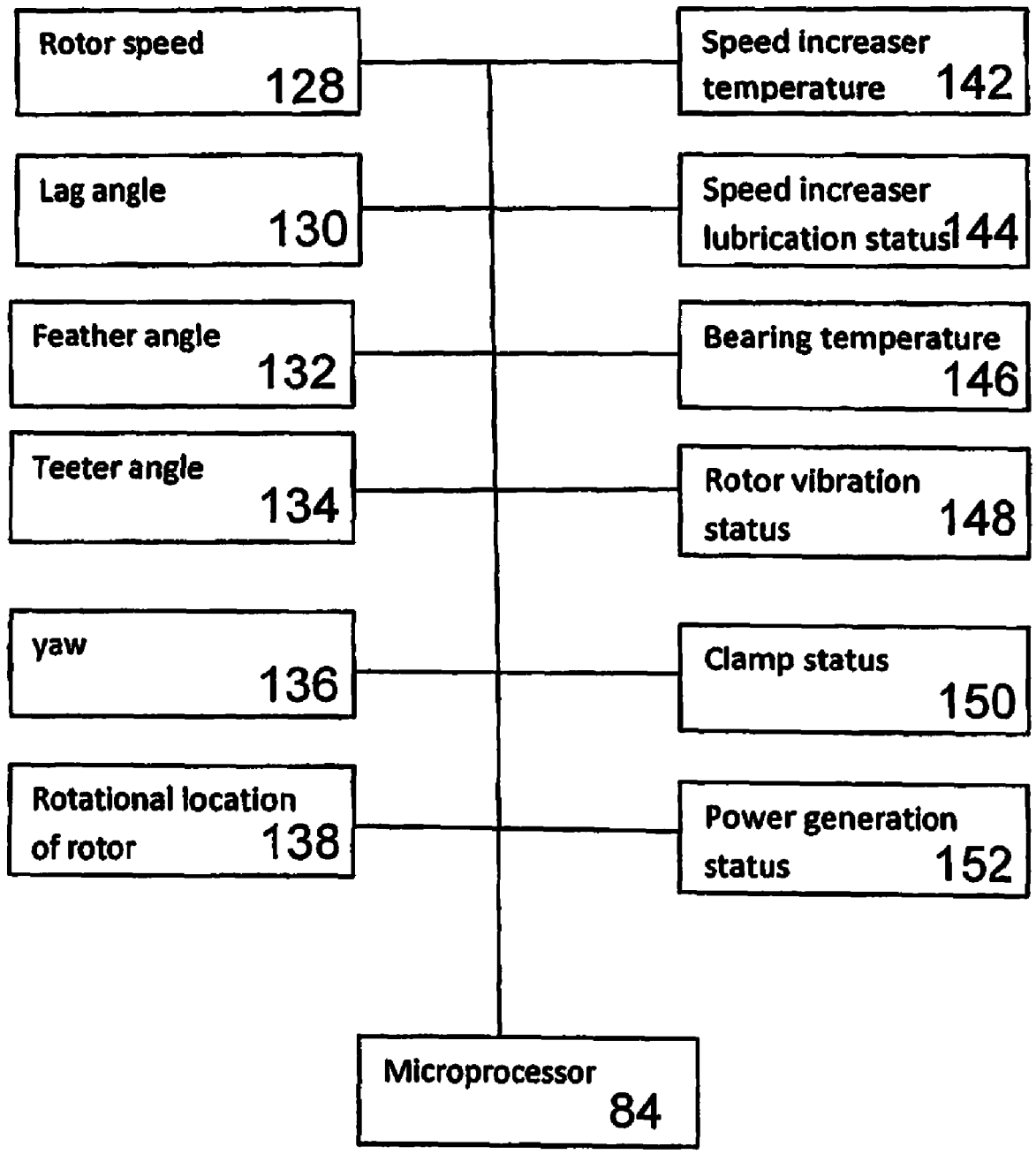
FIG. 16 is a schematic diagram of monitored operating conditions.

The control system 85 also responds to the operating conditions 99 of the wind generator as detected by condition sensors 92 (FIG. 12) in determining whether the blades 12 should be in the first or the second positions. The condition sensors 92 provide feedback to the control system 85 and provide actual information as to the status of the rotor 4, generator 34, speed increaser 30 and other components of the wind turbine. The conditions sensors 92 are operably connected to the microprocessor 84. Those condition sensors 92 may include any parameter found useful in governing the wind turbine and may be selected from at least the following list, as shown by FIG. 16: rotor speed 128, lag angle 130, feather angle 132, teeter angle 134, yaw 136 of nacelle 22, rotational location of rotor 138, speed increaser temperature 142, speed increaser lubrication status 144, bearing temperature 146, rotor vibration status 148, clamp status 150 and power generation status 152.

Rotor speed 128 is the angular speed of the rotor 4 about the axis of rotation 8 and is controlled by the control system 85 through selection of the feather angle 132, lag angle 74 and yaw 136. The control system 85 will select those parameters to maintain a design rotor speed of 11 rpm. Lag angle 130, feather angle 132 and yaw 136 may be monitored to verify that commanded values for those parameters actually are implemented by the control effectors and that the values are proper for mooring of the blades 12. Teeter angle 134 may be monitored as a measure of the differential forces of the wind 10 acting on the rotor 4 in different portions of its rotation. The rotational location of rotor 138 may be monitored during mooring and unmooring to ensure that the hub beam 40 and hence blades 12 are in the proper position for mooring.

The control system 85 may monitor operating conditions 99 comprising various mechanical parameters to avoid mechanical failures, such as speed increaser temperature 142 and lubrication status 144 or a bearing temperature 146. If the speed increaser 30 or a bearing is running at higher-than-expected temperatures, the speed increaser 39 or bearing may be in the process of failing and the control system 85 may reduce the power generated by the turbine or may elect to move the blades 12 to the second position until repairs can be effected. If the lubrication status 144 of the speed increaser 30 indicates that the speed increaser 30 is operating without sufficient lubrication, the control system 85 may determine to move the blades 12 to the second position to avoid damage to the speed increaser 30.

The control system 85 may monitor the vibration status 148 of the rotor 4; namely, the rotor 4 vibration frequency, amplitude, or both. The control system 85 may command steps to control vibration, such as changing the feather angle 58, lag angle 60, yaw angle 136, or by directing the rotor 4 to move to the second position.

The control system 85 may monitor the clamp status 150 of clamp 20; namely, whether clamp 20 is in the clamped position or the released position, to verify that the blade 12 is in fact moored after a mooring command 108 is issued by the control system 85 and to verify that the clamp 20 is released when an unmooring command 108 is issued. The power generation status 152 will advise the control system 85 of electrical potential and power generated to verify optimal operation of the turbine. Should the control system 85 detect an operating condition 99 that indicates out-of-tolerance performance by any operating system, the control system 85 can take corrective action by an appropriate command to any actuator 110 or can direct the rotor 2 into the second position, shutting down and preserving the wind turbine until inspection and repair can be effected.

Figure 17:
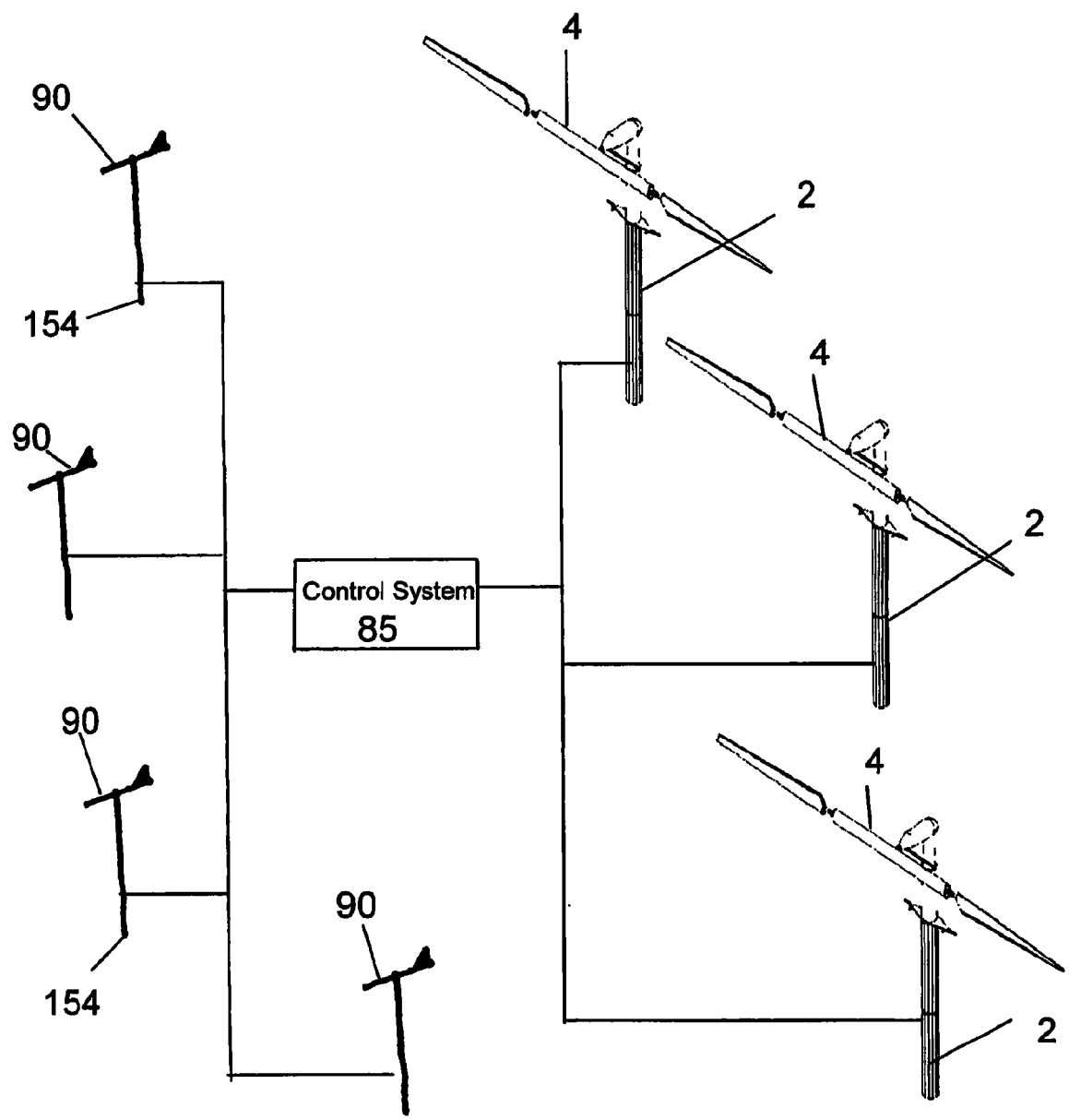
FIG. 17 is a schematic diagram of a plurality of wind generators operated by a single control system utilizing a plurality of weather condition monitoring locations.

As shown by FIG. 17, each weather sensor 90 is located at a weather sensor location 154. A single control system 85 may receive information on weather conditions 87 from a plurality of weather sensors 90 located in a plurality of different weather sensor locations 154. Weather sensor locations 154 may be remote from towers 2. The single control system 85 also may receive information on operating conditions 99 at each of the plurality of wind generators from a plurality of condition sensors 92 located at each wind generator.

Using the control system 85, a single human operator located in a distant city can control the operation of multiple wind farms each comprising many wind turbines located in distant and remote locations using information on weather conditions 87 collected by local, regional and national weather sensors 90, including weather satellites. The automated control system 85 can determine the operating parameters of each actuator 110 for each turbine based on the weather conditions 87 detected and predicted for the location of the turbine and based upon operating conditions 99 of the turbine. If the control system 85 detects or predicts a weather condition 87 or an operating condition 99 that may exceed any operating parameter for a turbine, the control system may issue or maintain a mooring command 108 directing the actuators 110 for that turbine to move to or maintain the rotor 4 of the turbine in the second position. If the human operator concludes that the command 108 of the control system 85 is inappropriate, the human operator can instruct 97 the control system 85 to issue a different command 108.

LIST OF CLAIM ELEMENTS

The following is a list of elements from the Claims including the element numbers assigned to each of the elements as described in the Specification and shown by the drawings. The elements are listed below generally in the order in which they appear in the Claims.

a tower 2
an electrical generator 34
a ground 6
a rotor 4
a first position (FIG. 2)
a second position (FIG. 3)
a wind 10
an actuator 110
a mooring command 108
an un-mooring command 108
a weather sensor 90
a weather condition 87
a weather sensor location 154
a spaced apart relation
a plurality of weather sensors 90
a plurality of weather sensor locations 154
a plurality of weather conditions 87
a microprocessor 84
a computer memory 86
a control rule 88
a condition sensor 92
an operating condition 99
a rotational speed of said rotor 128
a feather angle 132
lag angle 130
a teeter angle 134
a yaw of said rotor axis of rotation 136
a rotational location of said rotor 138
a temperature of a speed increaser 142
a lubrication status of said speed increaser 144
a temperature of a bearing 146
a vibration status of said rotor 148
a damping status of a rotor clamp
a power generation status of said electrical generator 152
wind speed 95
wind direction 93
wind profile by elevation 96
an air temperature 98 a humidity 100
a barometric pressure 102
a return of a radar signal 104
a weather prediction 106
a human interface 94
an instruction 97
an electrical engagement system 122
an electrical output of said electrical generator 124
an electrical load 126
a brake/indexer 36
an axis of rotation 8
an actuator 110
a mooring hinge 16
a cradle 18
a damp 20
a clamped position (element 20, FIG. 3)
a released position (element 20, FIG. 4)
a hub beam 40
a hub beam end 56
a feathering hinge 58
a lag/fold hinge 60
a wind turbine blade 12
a pair of opposing hub beam ends 56
a pair of opposing feathering hinges 58
a pair of said lag/fold hinges 60
a pair of said blades 12
a nacelle 22
a plane of rotation of said rotor 50
a strap 82
a loop 83
a para-aramid synthetic fiber 81
an operating limitation
a plurality of said towers and said rotors 10, 4
a plurality of said electrical generators 34
a teetering hinge 42
a chord 76
a longitudinal dimension 68
a plane corresponding to said chord
a root of said turbine blade 70
control system 85

What is claimed is:

1. A horizontal wind-powered electrical generating unit apparatus, the apparatus comprising:
   a. a tower;
   b. an electrical generator, said electrical generator being supported by said tower above a ground;
   c. a wind turbine rotor, said wind turbine rotor being operably connected to said electrical generator and supported by said tower above said ground, said turbine rotor having a first position and a second position, said turbine rotor having a rotor hub, said turbine rotor being configured for rotation about said rotor hub in response to a wind when said turbine rotor is in said first position, said turbine rotor having a blade, said blade being releasably attached to said tower and said turbine rotor not being rotatable when said turbine rotor is in said second position;
   d. an actuator, said actuator being operably connected to said tower, said actuator being configured to receive a mooring command and an un-mooring command, said actuator being configured to move said rotor from said first position to said second position in response to said mooring command, said actuator being configured to move said rotor from said second position to said first position in response to said un-mooring command.

2. The wind-powered electrical generating unit apparatus of claim 1, the apparatus further comprising:
   a. a weather sensor, said weather sensor being configured to detect a weather condition;
   b. a control system, said control system being in communication with said weather sensor, said control system being configured to generate said mooring command and said un-mooring command based upon said weather condition detected by said weather sensor, said control system being configured to communicate said mooring command and said un-mooring command to said actuator.

3. The apparatus of claim 2 wherein said weather sensor is located at a weather sensor location, said weather sensor location is in a spaced apart relation to said tower and said rotor.

4. The apparatus of claim 3 wherein said sensor is a one of a plurality of weather sensors located at a plurality of weather sensor locations and wherein said weather condition is a one of a plurality of weather conditions, said control system being configured to generate said mooring command based upon said plurality of weather conditions detected by said plurality of weather sensors.

5. The apparatus of claim 4 wherein said control system comprises:
   a. a microprocessor, said microprocessor being operably connected to said plurality of weather sensors and to said mooring actuator;
   b. a computer memory connected to said microprocessor, said computer memory storing a control rule accessible to said microprocessor, said microprocessor being configured to apply said control rule to said plurality of weather conditions detected by said plurality of weather sensors to generate said mooring and said unmooring command.

6. A horizontal wind-powered electrical generating unit apparatus, the apparatus comprising:
   a. a tower;
   b. an electrical generator, said electrical generator being supported by said tower above a ground;
   c. a wind turbine rotor, said wind turbine rotor being operably connected to said electrical generator and supported by said tower above said ground, said turbine rotor having a first position and a second position, said turbine rotor being configured for rotation in response to a wind when said turbine rotor is in said first position, said turbine rotor being moored to said tower and not rotatable when said turbine rotor is in said second position;
   d. an actuator, said actuator being operably connected to said tower, said actuator being configured to receive a mooring command and an un-mooring command, said actuator being configured to move said rotor from said first position to said second position in response to said mooring command, said actuator being configured to move said rotor from said second position to said first position in response to said un-mooring command;
   e. a weather sensor, said weather sensor being configured to detect a weather condition, wherein said weather sensor is located at a weather sensor location, said weather sensor location is in a spaced apart relation to said tower and said rotor;
   f. a control system, said control system being in communication with said weather sensor, said control system being configured to generate said mooring command and said un-mooring command based upon said weather condition detected by said weather sensor, said control system being configured to communicate said mooring command and said un-mooring command to said actuator, wherein said sensor is a one of a plurality of weather sensors located at a plurality of weather sensor locations and wherein said weather condition is a one of a plurality of weather conditions, said control system being configured to generate said mooring command based upon said plurality of weather conditions detected by said plurality of weather sensors, wherein said control system comprises:
  i. a microprocessor, said microprocessor being operably connected to said plurality of weather sensors and to said mooring actuator;
  ii. a computer memory connected to said microprocessor, said computer memory storing a control rule accessible to said microprocessor, said microprocessor being configured to apply said control rule to said plurality of weather conditions detected by said plurality of weather sensors to generate said mooring and said unmooring command; and
  iii. a condition sensor, said condition sensor being configured to detect an operating condition of the apparatus, said microprocessor being in communication with said condition sensor, said microprocessor being configured to apply said control rule to said operating condition detected by said condition sensor in combination with said plurality of weather conditions to generate said mooring and said unmooring command.

7. The apparatus of claim 6 wherein said operating condition is selected from a list consisting of: a rotational speed of said rotor; a feather angle of said rotor; a lag angle of said rotor, a teeter angle of said rotor, a yaw of said rotor axis of rotation; a rotational location of said rotor; a temperature of a speed increaser, a lubrication status of said speed increaser, a temperature of a bearing; a vibration status of said rotor, a clamping status of a rotor clamp, a status of a rotor cradle, and a power generation status of said electrical generator.

8. The apparatus of claim 7 wherein said weather conditions are selected from a list consisting of a wind speed, a wind direction, a wind profile by elevation, an air temperature, a relative humidity, a return of a radar signal, and a weather prediction.

9. The apparatus of claim 6 wherein said control system further comprises: a human interface, said human interface being located remotely from said tower, said human interface being configured to communicate said plurality of weather conditions and said operating condition to a human operator, said human interface being configured to receive an instruction from said human operator and to communicate said instruction to said microprocessor, said microprocessor being configured to generate said mooring and said unmooring commands in response to said instruction from said human operator.

10. A horizontal wind-powered electrical generating unit apparatus, the apparatus comprising:
  a. a tower;
  b. an electrical generator, said electrical generator being supported by said tower above a ground;
  c. a wind turbine rotor, said wind turbine rotor being operably connected to said electrical generator and supported by said tower above said ground, said turbine rotor having a first position and a second position, said turbine rotor being configured for rotation in response to a wind when said turbine rotor is in said first position, said turbine rotor being moored to said tower and not rotatable when said turbine rotor is in said second position;
  d. an actuator, said actuator being operably connected to said tower, said actuator being configured to receive a mooring command and an un-mooring command, said actuator being configured to move said rotor from said first position to said second position in response to said mooring command, said actuator being configured to move said rotor from said second position to said first position in response to said un-mooring command said actuator comprising:
    i. an electrical engagement system, said electrical engagement system selectably connecting an electrical output of said electrical generator to an electrical load, said electrical engagement system being configured to remove said electrical load from said electrical output of said generator in response to said mooring command, said electrical engagement system being configured to restore said electrical load to said electrical output of said generator in response to said unmooring command;
    ii. a brake/indexer supported by said tower, said rotor having an axis of rotation, said axis of rotation being generally horizontal with respect to said ground, said brake/indexer being configured to selectably restrain a rotation of said rotor about said axis of rotation in response to said mooring command, said brake/indexer being configured to release said rotor and to allow said blade to rotate about said axis of rotation in response to said un-mooring command;
    iii. a folding actuator, said rotor defining a mooring hinge, said rotor when in said second position being folded about said mooring hinge, said rotor when in said first position being unfolded about said mooring hinge, said folding actuator being configured to selectably fold and unfold said rotor about said mooring hinge in response to said mooring command and said un-mooring command, respectively;
    iv. a cradle, said cradle being attached to said tower, said rotor engaging said cradle when said rotor is in said second position;
    v. a clamp, said clamp being attached to said tower, said clamp being selectably movable between a clamped position and a released position, said clamp when in said clamped position securing said rotor to said cradle when said rotor is in said second position, said clamp when in said released position not securing said rotor to said cradle.

11. The apparatus of claim 10 wherein said rotor comprising:
  a. a hub beam, said hub beam being configured to rotate about said axis of rotation, said hub beam having a hub beam end, said hub beam end being in a spaced apart relation to said axis of rotation;
  b. a feathering hinge attached to said hub beam end;
  c. a lag/fold hinge attached to said feathering hinge, said lag/fold hinge and said feathering hinge in combination defining said mooring hinge;
  d. a turbine blade attached to said lag/fold hinge, said turbine blade extending radially from said lag/fold hinge when said rotor is in said first position, said turbine blade engaging said cradle when said rotor is in said second position.

12. The apparatus of claim 11 wherein said hub beam end is one of a pair of opposing hub beam ends, both of which hub beam ends are in spaced-apart relation to said axis of rotation, said feathering hinge is a one of a pair of opposing feathering hinges attached to said opposing hub beam ends, said lag/fold hinge is one of a pair of said lag/fold hinges attached to said feathering hinges, and said blade is a one of a pair of said blades attached to said lag/fold hinges.

13. The apparatus of claim 12, the apparatus further comprising: a nacelle, said nacelle being supported by said tower, said nacelle housing said electrical generator, said nacelle supporting said hub beam such that a plane of rotation of said rotor is in a spaced apart relation with said tower, said spaced-apart relation being selected to avoid a strike by a one of said blades against said tower, said spaced-apart relation between said pair of feathering hinges being selected to avoid an interference between said pair of blades and said nacelle when said rotor is in said second position.

14. The apparatus of claim 12, the apparatus further comprising: a strap, said strap being formed into a loop, said strap being composed of a fabric, said strap connecting said pair of feathering hinges one to the other.

15. A method for generating electrical power, the method comprising:
  a. providing a tower and a rotor supported by said tower above a ground, said rotor having a first position and a second position, said rotor defining a rotor hub, said rotor being configured for rotation about said rotor hub in response to a wind when said rotor is in said first position, said rotor defining a blade, said blade having a folding hinge, said blade being folded about said folding hinge and releasably attached to said tower when said rotor is in said second position, said blade not being releasably attached to said tower when said rotor is in said first position;
  b. generating electrical power by an electrical generator, said electrical generator being rotationally attached to said rotor, said electrical generator being configured to generate electrical power in response to a rotation of said rotor when said rotor is in said first position;
  c. detecting a weather condition using a weather sensor, said weather sensor being located at a weather sensor location, said weather condition sensor being in communication with a control system;
  d. determining by said control system of whether an operating limitation may be exceeded based on said weather condition;
  e. generating a mooring command by said control system when said rotor is in said first position and said control system determines that said operating limitation may be exceeded based on said weather condition;
  f. activating an actuator in response to said mooring command, said actuator being operably connected to said tower, said actuator being configured to receive said mooring command, said actuator being configured to move said rotor from said first position to said second position in response to said mooring command
  g. generating an un-mooring command by said control system when said blade is in said second position and said control system determines that said operating limitation will not be exceeded based on said weather condition;
  h. activating said actuator in response to said un-mooring command, said actuator being configured to move said rotor from said second position to said first position in response to said un-mooring command.

16. A method for generating electrical power, the method comprising:
  a. providing a tower and a rotor supported by said tower above a ground, said rotor having a first position and a second position, said rotor being configured for rotation in response to a wind when said rotor is in said first position, said rotor being moored to said tower when said rotor is in said second position;
  b. generating electrical power by an electrical generator, said electrical generator being rotationally attached to said rotor, said electrical generator being configured to generate electrical power in response to a rotation of said rotor when said rotor is in said first position;
  c. detecting a weather condition using a weather sensor, said weather sensor being located at a weather sensor location, said weather condition sensor being in communication with a control system;
  d. determining by said control system of whether an operating limitation may be exceeded based on said weather condition;
  e. generating a mooring command by said control system when said rotor is in said first position and said control system determines that said operating limitation may be exceeded based on said weather condition;
  f. activating an actuator in response to said mooring command, said actuator being operably connected to said tower, said actuator being configured to receive said mooring command, said actuator being configured to move said rotor from said first position to said second position in response to said mooring command
  g. generating an un-mooring command by said control system when said blade is in said second position and said control system determines that said operating limitation will not be exceeded based on said weather condition;
  h. activating said actuator in response to said un-mooring command, said actuator being configured to move said rotor from said second position to said first position in response to said un-mooring command, wherein said weather sensor is a one of a plurality of weather sensors located at a plurality of weather sensor locations, and wherein said weather condition is a one of a plurality of weather conditions, said plurality of weather conditions being selected from a list consisting of a wind direction, a wind speed, a wind profile by elevation, an air temperature, a humidity, a barometric pressure, a radar return, a weather prediction and a weather alert, said control system being configured to generate said mooring command based upon said plurality of weather conditions detected by said plurality of weather sensors.

17. The method of claim 16 wherein said control system comprises:
  a. a microprocessor, said microprocessor being operably connected to said sensor and to said mooring actuator;
  b. a computer memory connected to said microprocessor, said computer memory storing a control rule accessible to said microprocessor, said microprocessor applying said control rule to said plurality of weather conditions detected by said plurality of weather sensors to determine whether to generate said mooring or said unmooring command, the method further comprising: detecting an operating condition using a condition sensor, said condition sensor being operatively connected to said microprocessor, said control system generating said mooring command when said control system determines that said operating limitation may be exceeded based on said weather condition and said operating condition, said operating condition being selecting from a list consisting of: a rotor speed, a lag angle, a feather angle, a teeter angle, a yaw, a rotational location of said rotor, a lighting strike status, a speed increaser temperature, a speed increaser lubrication status, a bearing temperature, a rotor vibration status, a clamp status and a power generation status.

18. The method of claim 17 wherein said tower and said rotor are a one of a plurality of said towers and a plurality of said rotors, each of said plurality of said rotors having said first and said second positions, said electrical generator being a one of a plurality of said electrical generators, each said electrical generator being operably attached to a one of said rotors, each said electrical generator being configured to generate said electrical power in response to said rotation of said one of said rotors when said one of said rotors is in said first position, the method further comprising:
 a. generating said mooring command for any one of said rotors by said control system when said any one of said rotors is in said first position and said control system determines that said operating limitation may be exceeded based on said weather condition or said operating condition;
 b. activating said actuator in response to said mooring command, said actuator being operably connected to said one of said plurality of towers, said actuator being configured to receive said mooring command, said actuator being configured to move said one of said rotors from said first position to said second position in response to said mooring command;
 c. generating an un-mooring command by said control system when said one of said rotors is in said second position and said control system determines that said operating limitation will not be exceeded based on said weather condition;
 d. activating said actuator in response to said un-mooring command, said actuator being configured to move said one of said rotors from said second position to said first position in response to said un-mooring command.

19. A method for generating electrical power, the method comprising:
 a. providing a tower and a rotor supported by said tower above a ground, said rotor having a first position and a second position, said rotor being configured for rotation in response to a wind when said rotor is in said first position, said rotor being moored to said tower when said rotor is in said second position;
 b. generating electrical power by an electrical generator, said electrical generator being rotationally attached to said rotor, said electrical generator being configured to generate electrical power in response to a rotation of said rotor when said rotor is in said first position;
 c. detecting a weather condition using a weather sensor, said weather sensor being located at a weather sensor location, said weather condition sensor being in communication with a control system;
 d. determining by said control system of whether an operating limitation may be exceeded based on said weather condition;
 e. generating a mooring command by said control system when said rotor is in said first position and said control system determines that said operating limitation may be exceeded based on said weather condition;
 f. activating an actuator in response to said mooring command, said actuator being operably connected to said tower, said actuator being configured to receive said mooring command, said actuator being configured to move said rotor from said first position to said second position in response to said mooring command
 g. generating an un-mooring command by said control system when said blade is in said second position and said control system determines that said operating limitation will not be exceeded based on said weather condition;
 h. activating said actuator in response to said un-mooring command, said actuator being configured to move said rotor from said second position to said first position in response to said un-mooring command, wherein said actuator comprises:
  i. a brake/indexer supported by said tower, said brake/indexer being configured to selectably restrain a rotation of said rotor in response to said mooring command, said brake/indexer being configured to release said rotor and to allow said rotor to rotate in response to said un-mooring command;
  ii. a mooring hinge actuator, said rotor comprising a mooring hinge, said rotor when in said second position being folded about said mooring hinge, said rotor when in said first position being unfolded about said mooring hinge, said mooring hinge actuator being configured to selectably fold said rotor about said mooring hinge in response to said mooring command, said mooring hinge actuator being configured to selectably unfold said rotor about said mooring hinge in response to said un-mooring command;
  iii. a cradle, said cradle being attached to said tower, said rotor engaging said cradle when said rotor is in said second position;
  iv. a clamp, said clamp being attached to said tower, said clamp being selectably movable between a clamped position and a released position, said clamp when in said clamped position securing said folded rotor to said cradle when said rotor is in said second position, said clamp when in said released position not securing said rotor to said cradle;
  v. an electrical engagement system, said electrical engagement system selectably connecting an electrical output of said electrical generator to an electrical load, said electrical engagement system being configured to remove said electrical load from said electrical output of said generator in response to said mooring command, said electrical engagement system being configured to restore said electrical load to said electrical output of said generator in response to said unmooring command.

20. The method of claim 19 wherein said rotor comprises:
 a. a hub beam having two opposing ends in a spaced-apart relation, said hub beam being attached to said tower by a teetering hinge intermediate between said two opposing ends of said hub beam, said hub beam being rotatable about an axis of rotation, said axis of rotation passing through said teetering hinge;
 b. a pair of feathering hinges disposed at said opposing ends of said hub beam and an opposing pair of lag/fold hinges attached to said pair of feathering hinges;
 c. a pair of turbine blades attached to said opposing pair of lag/fold hinges, said pair of turbine blades each defining a chord and a longitudinal dimension, said lag/fold hinges being configured to allow a pivoting of said turbine blades about said lag/fold hinges in a plane corresponding to said chord of a root of said turbine blade, said feathering hinges being configured to allow a rotation of said blade generally about said longitudinal dimension of said blade, said mooring hinge comprising said feathering and said lag/fold hinges, said mooring hinge actuator being configured to fold said turbine blades about said feathering hinge and said lag/fold hinge;
 d. a strap joining said pair of feathering hinges one to the other, said strap defining a loop, said loop being disposed within said hub beam.

* * * * *